United States Patent
Gillott

(10) Patent No.: US 11,125,901 B2
(45) Date of Patent: Sep. 21, 2021

(54) MARINE SURVEY SOURCE FIRING CONTROL

(71) Applicant: Magseis FF LLC, Houston, TX (US)

(72) Inventor: Graham Gillott, Arona (IT)

(73) Assignee: MAGSEIS FF LLC, Houston, TX (US)

(*) Notice: Subject to any disclaimer, the term of this patent is extended or adjusted under 35 U.S.C. 154(b) by 307 days.

(21) Appl. No.: 16/446,400

(22) Filed: Jun. 19, 2019

(65) Prior Publication Data
US 2020/0400851 A1    Dec. 24, 2020

(51) Int. Cl.
*G01V 1/38* (2006.01)

(52) U.S. Cl.
CPC .......... *G01V 1/3861* (2013.01); *G01V 1/3843* (2013.01); *G01V 2210/1293* (2013.01); *G01V 2210/1423* (2013.01)

(58) Field of Classification Search
CPC ............... G01V 1/3861; G01V 1/3843; G01V 2210/1293; G01V 2210/1423; G01V 1/006; G01V 1/3808
See application file for complete search history.

(56) References Cited

U.S. PATENT DOCUMENTS

| | | | |
|---|---|---|---|
| 5,924,049 A | 7/1999 | Beasley et al. | |
| 2012/0081998 A1* | 4/2012 | Almaas ................ | G01V 1/3861 367/23 |
| 2012/0147701 A1 | 6/2012 | Ross et al. | |
| 2013/0250720 A1 | 9/2013 | Monk et al. | |
| 2014/0362663 A1* | 12/2014 | Jones ..................... | G01V 1/306 367/21 |
| 2015/0131409 A1* | 5/2015 | Abma .................. | G01V 1/3808 367/7 |
| 2020/0025959 A1* | 1/2020 | Andersson ............. | G01V 1/364 |

FOREIGN PATENT DOCUMENTS

| | | |
|---|---|---|
| AU | 2011338244 A1 | 7/2013 |
| EP | 3 199 981 A1 | 8/2017 |
| GB | 2 436 699 A | 10/2007 |
| WO | WO-2016/201197 A1 | 12/2016 |

OTHER PUBLICATIONS

International Search Report and Written Opinion for PCT/US2019/044916 dated Mar. 10, 2020 (24 pages).
Non-Final Office Action for U.S. Appl. No. 16/446,406 dated Aug. 9, 2021 (9 pages).

* cited by examiner

*Primary Examiner* — Ian J Lobo
(74) *Attorney, Agent, or Firm* — Foley & Lardner LLP

(57) ABSTRACT

A seabed object detection system can include a source array and a data processing system. The source array can include a first source and a second source. The data processing system can include one or more processors. The data processing system can determine a first position of the first source and can identify a first firing time of the second source. The data processing system can initiate a first source shot of the first source at the first position and the second source at the first firing time. The data processing system can determine a target position and estimated position for the first source. The data processing system can determine a second position of the first source based on a difference between the target position and the estimated position. The data processing system can initiate a second source shot of the first source at the second position.

20 Claims, 8 Drawing Sheets

MARINE SURVEY SOURCE FIRING CONTROL

BACKGROUND

Seismic or other operations performed on a piece of earth can identify subterranean characteristics or features of the analyzed piece of earth.

SUMMARY

At least one aspect of the present disclosure is directed to a seabed object detection system. The seabed object detection system can include a source array. The source array can include a first source and a second source. The seabed object detection system can include a data processing system. The data processing system can include one or more processors. The data processing system can determine a first position of the first source. The data processing system can identify a first firing time of the second source. The data processing system can initiate a first source shot of the first source at the first position of the first source. The data processing system can initiate a first source shot of the second source at the first firing time of the second source. The data processing system can determine a target position for the first source. The data processing system can determine an estimated position for the first source. The data processing system can determine, based on a difference between the target position and the estimated position, a second position of the first source. The data processing system can initiate a second source shot of the first source at the second position of the first source.

At least one aspect of the present disclosure is direct to a method of seabed object detection. The method can include identifying, by the data processing system, a first firing time of the second source. The method can include initiating, by the data processing system, a first source shot of the first source at the first position of the first source. The method can include initiating, by the data processing system, a first source shot of the second source at the first firing time of the second source. The method can include determining, by the data processing system, a target position for the first source. The method can include determining, by the data processing system, an estimated position for the first source. The method can include determining, by the data processing system, based on a difference between the target position and the estimated position, a second position of the first source. The method can include initiating, by the data processing system, a second source shot of the first source at the second position of the first source.

At least one aspect of the present disclosure is directed to a seabed object detection system. The seabed object detection system can include a source array. The source array can include a first source, a second source, a third source, and a fourth source. The seabed object detection system can include a data processing system. The data processing system can include one or more processors. The data processing system can determine a first position of the first source. The data processing system can calculate a first firing time of the second source, a first firing time of the third source, and a first firing time of fourth source. The data processing system can initiate a first source shot of the first source at the first position of the first source. The data processing system can initiate a first source shot of the second source at the first firing time of the second source, a first source shot of the third source at the first firing time of the third source, and a first source shot of the fourth source at the first firing time of the fourth source. The data processing system can determine a target position for the first source, the target position less than 10 meters from the first position of the first source. The data processing system can determine an estimated position for the first source. The data processing system can determine, based on a difference between the target position and the estimated position, a second position of the first source. The data processing system can initiate a second source shot of the first source at the second position of the first source.

At least one aspect of the present disclosure is direct to a method of seabed object detection. The method can include providing a source array comprising a first source, a second source, a third source, and a fourth source. The method can include determining, by a data processing system having one or more processors, a first position of the first source. The method can include identifying, by the data processing system, a first firing time of the second source, a first firing time of the third source, and a first firing time of fourth source. The method can include initiating, by the data processing system, a first source shot of the first source at the first position of the first source. The method can include initiating, by the data processing system, a first source shot of the second source at the first firing time of the second source, a first source shot of the third source at the first firing time of the third source, and a first source shot of the fourth source at the first firing time of the fourth source. The method can include determining, by the data processing system, a target position for the first source, the target position less than 10 meters from the first position of the first source. The method can include determining, by the data processing system, an estimated position for the first source. The method can include determining, by the data processing system, based on a difference between the target position and the estimated position, a second position of the first source. The method can include initiating, by the data processing system, a second source shot of the first source at the second position of the first source.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Reflection-based surveys can obtain information relating to subsurface features. The acoustic signals described herein can reflect off subsurface lithological formations and be acquired, analyzed and interpreted. However, reflection-based surveys typically cover a narrow area and collect a sparse set of data, both of which are factors that contribute to an increased time required to complete the surveys. Additionally, small shallow objects such as boulders buried in the seabed may be difficult to precisely image due to the resolution capabilities of reflection-based surveys. These small objects can complicate or delay wind turbine, marine or ocean bottom constructions that are fixed to the seabed, as well as the placement of cable connections and communication lines between these wind turbine, marine or ocean bottom constructions.

The present disclosure is directed to systems and methods for seabed object detection. Due to the limitations of reflection-based surveys, it can be challenging to detect small shallow objects in the seabed. Inefficiencies related to increased survey time, such as a greater risk of weather-based delays, can increase the operating cost of these surveys without providing an accurate map of obstacles in the seabed. Additionally, precise control of the firing times of sources and the knowledge of the position of sources can aid in accurate imaging of the seabed. Systems and methods of the present disclosure can solve these and other problems associated with performing a survey to detect seabed objects.

The present disclosure is directed to systems and methods for seabed object detection. For example, the seabed object detection system can provide an accurate map of obstacles in the seabed. The system can include a source array. The source array can include a first source and a second source. The system can include a data processing system including one or more processors. The data processing system can determine a position of the first source. The data processing system can identifying a first firing time of the second source. The data processing system can initiate a first source shot of the first source at a known position and the second source at a known time. The data processing system can determine a target position and estimated position for the first source. The data processing system can determine a second position of the first source based on a difference between the target position and the estimated position. The data processing system can initiate a second source shot of the first source at a known position.

Figure 1:
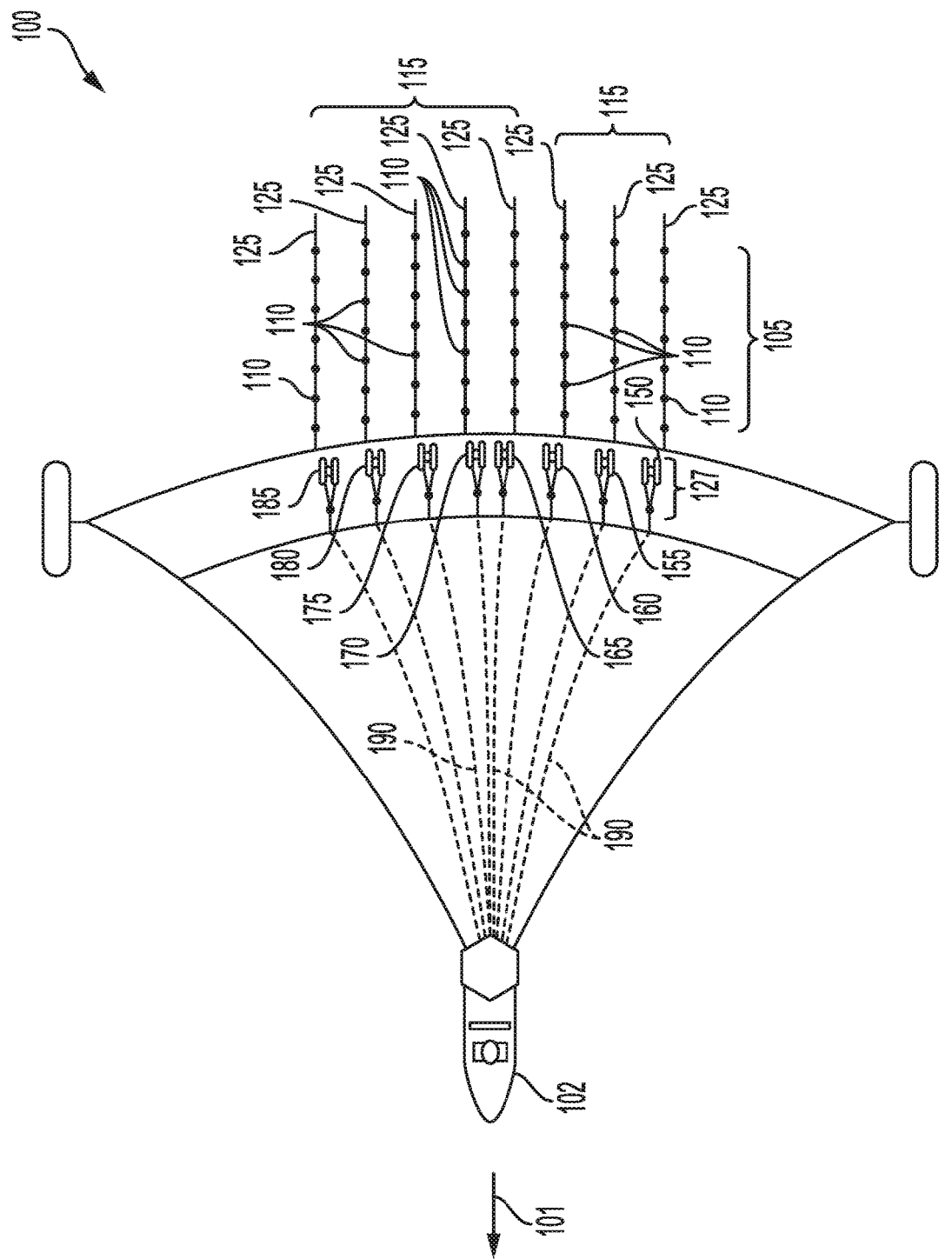
FIG. 1 illustrates a seabed object detection system according to an example implementation.

FIG. 1 illustrates an example seabed object detection system 100 illustrative of a marine environment in which the systems and methods of the present disclosure can perform a seismic survey to detect seabed objects. The seabed object detection system 100 can include a receiver array 105. The receiver array 105 can include a streamer 125. For example, the streamer 125 may be a cable (e.g., a surface marine cable), an assembly of wires, or any component capable of connecting a receiver to a recording device which may be located on a vessel 102. The receiver array 105 can include a plurality of receivers 110. The plurality of receivers 110 can be disposed on a plurality of streamers 115. A streamer of the plurality of streamers 115 may be a cable (e.g., a surface marine cable), an assembly of wires, or any component capable of connecting a receiver to a recording device which may be located on a vessel 102. The receiver array 105 can include one or more receivers. For example, the receiver array 105 can include a plurality of receivers 110 coupled to a plurality of streamers 115. The receiver array 105 can include a pattern of receivers. For example, the plurality of receivers 110 can be coupled to the plurality of streamers 115 along a line. The plurality of receivers 110 of the receiver array 105 can be coupled to the plurality of streamers 115 in a grid pattern. The receiver array 105 can be the pattern formed by the plurality of receivers 110 disposed on the plurality of streamers 115. For example, the receiver array 105 can include a plurality of receivers 110 disposed along a streamer of the plurality of streamers 115. The receiver array 105 can include a plurality of receivers 110 disposed on multiple streamers of the plurality of streamers 115. The receiver array 105 can receive diffraction data diffracted off an object in the seabed.

The receiver array 105 can include a plurality of receivers 110. The plurality of receivers 110 can receive diffraction data diffracted off an object in a seabed. For example, a receiver of the plurality of receivers 110 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The plurality of receivers 110 can be configured to detect acoustic waves that are reflected by seabed objects. The plurality of receivers 110 can be configured to detect acoustic waves that are diffracted by seabed objects. The plurality of receivers 110 can detect diffraction data from edges of objects. For example, the plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The plurality of receivers 110 can detect objects with irregular surface features. For example, the plurality of receivers 110 can detect objects with facets, edges, sharp boundaries, or textures. The seabed objects can be completely buried within the seabed. The seabed objects can be partially buried within the seabed.

The seabed object detection system 100 can include a source array 127. The source array can include a first source 150. For example, the first source 150 can generate a source shot. The first source 150 can generate acoustic waves. The source array 127 can generate an acoustic signal to be received by the receiver array 105. The source array 127 including the first source 150 can include a pattern of sources. The source array 127 can include a second source 155. For example, the second source 155 can generate a source shot. The second source 155 can generate acoustic waves. The source array 127 can generate an acoustic signal to be received by the receiver array 105. The source array 127 including the second source 155 can include a pattern of sources.

The source array 127 can include a third source 160. For example, the third source 160 can generate a source shot. The third source 160 can generate acoustic waves. The source array 127 can generate an acoustic signal to be received by the receiver array 105. The source array 127 including the third source 160 can include a pattern of sources. The source array 127 can include a fourth source 165. For example, the fourth source 165 can generate a source shot. The fourth source 165 can generate acoustic waves. The source array 127 can generate an acoustic signal to be received by the receiver array 105. The source array 127 including the fourth source 165 can include a pattern of sources.

The source array 127 can include a fifth source 170. For example, the fifth source 170 can generate a source shot. The fifth source 170 can generate acoustic waves. The source array 127 can generate an acoustic signal to be received by the receiver array 105. The source array 127 including the fifth source 170 can include a pattern of sources. The source array 127 can include a sixth source 175. For example, the sixth source 175 can generate a source shot. The sixth source 175 can generate acoustic waves. The source array 127 can generate an acoustic signal to be received by the receiver array 105. The source array 127 including the sixth source 175 can include a pattern of sources.

The source array 127 can include a seventh source 180. For example, the seventh source 180 can generate a source shot. The seventh source 180 can generate acoustic waves. The source array 127 can generate an acoustic signal to be received by the receiver array 105. The source array 127 including the seventh source 180 can include a pattern of sources. The source array 127 can include an eighth source 185. For example, the eighth source 185 can generate a source shot. The eighth source 185 can generate acoustic waves. The source array 127 can generate an acoustic signal to be received by the receiver array 105. The source array 127 including the eighth source 185 can include a pattern of sources.

The seabed object detection system 100 can include a vessel 102. The vessel 102 can tow the receiver array 105. The vessel 102 can tow the source array 127. The vessel 102 can tow the source array 127 in a tow direction 101. The vessel 102 can tow the receiver array 105 in a tow direction 101. The vessel 102 can tow the first source 150. The vessel 102 can tow the second source 155. The vessel 102 can tow the third source 160. The vessel 102 can tow the fourth source 165. The vessel 102 can tow the fifth source 170. The vessel 102 can tow the sixth source 175. The vessel 102 can tow the seventh source 180. The vessel 102 can tow the eighth source 185. The vessel 102 can tow the first source 150 ahead of the receiver array 105. The vessel 102 can tow the second source 155 ahead of the receiver array 105. The vessel 102 can tow the third source 160 ahead of the receiver array 105. The vessel 102 can tow the fourth source 165 ahead of the receiver array 105. The vessel 102 can tow the fifth source 170 ahead of the receiver array 105. The vessel 102 can tow the sixth source 175 ahead of the receiver array 105. The vessel 102 can tow the seventh source 180 ahead of the receiver array 105. The vessel 102 can tow the eighth source 185 ahead of the receiver array 105.

The seabed object detection system 100 can include a power cable 190 to provide power to a source. For example, the power cable 190 may be a power cable to transmit electrical power from the vessel 102 to the first source 150. The power cable 190 may be a power cable to transmit electrical power from the vessel 102 to the second source 155. The power cable 190 may be a power cable to transmit electrical power from the vessel 102 to the third source 160. The power cable 190 may be a power cable to transmit electrical power from the vessel 102 to the fourth source 165. The power cable 190 may be a power cable to transmit electrical power from the vessel 102 to the fifth source 170. The power cable 190 may be a power cable to transmit electrical power from the vessel 102 to the sixth source 175. The power cable 190 may be a power cable to transmit electrical power from the vessel 102 to the seventh source 180. The power cable 190 may be a power cable to transmit electrical power from the vessel 102 to the eighth source 185.

Figure 2:
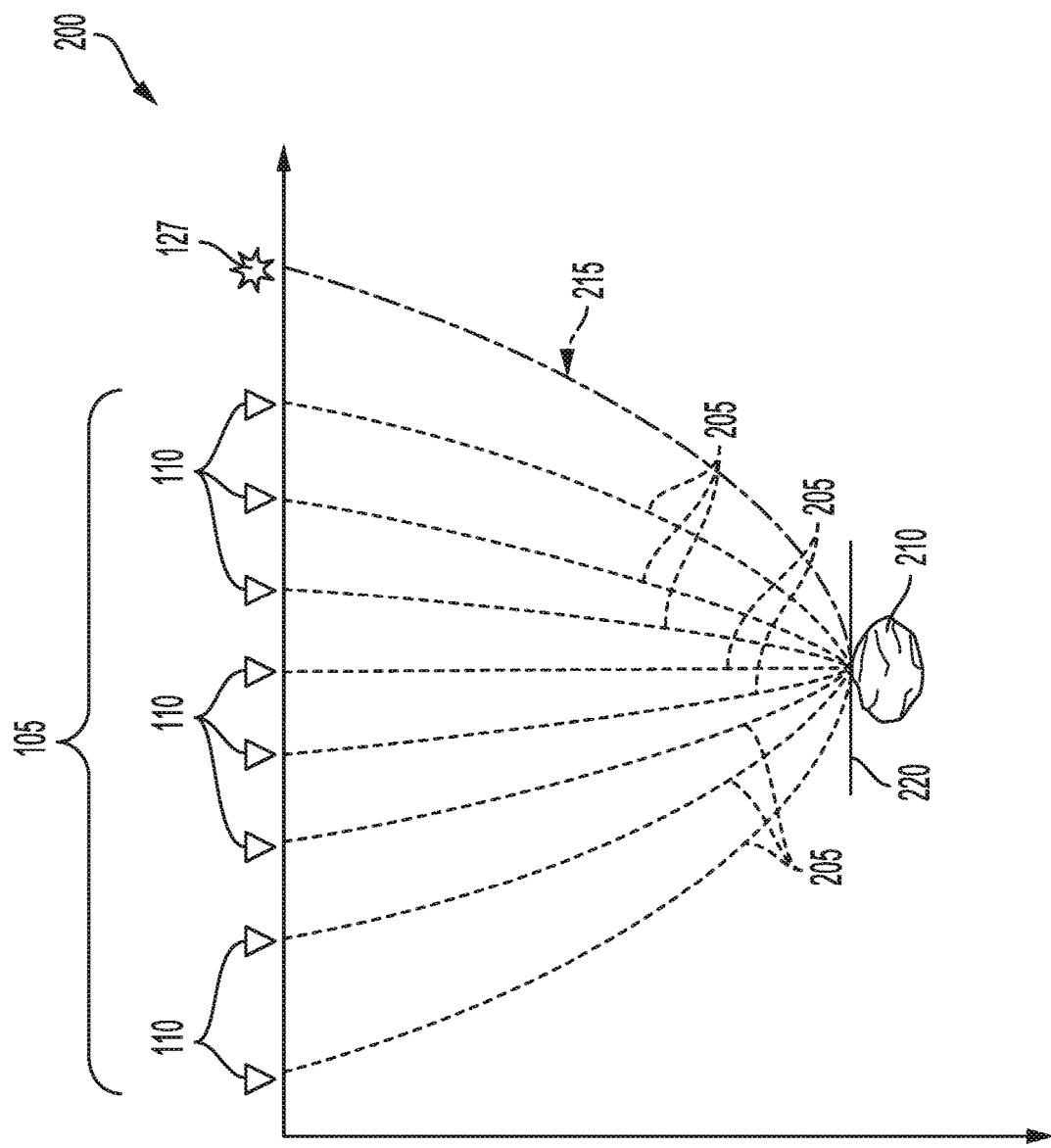
FIG. 2 illustrates a diffraction survey according to an example implementation.

FIG. 2 illustrates a diffraction survey 200. The diffraction survey 200 can include a receiver array 105 and a source array 127. The source array 127 can generate a source shot 215. The source shot 215 can travel through a medium (e.g., sea water) and diffract off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that diffract off the seabed object 210 may include diffraction data. The diffraction data may include diffracted waves 205. The receiver array 105 can receive diffraction data. For example, the receiver array 105 can receive the diffracted waves 205. The plurality of receivers 110 of the receiver array 105 can receive diffraction data. For example, the plurality of receivers 110 can receive the diffracted waves 205. The plurality of receivers 110 can be coupled with the streamer 125. A receiver of the plurality of receivers 110 can receive the diffracted waves 205. The diffraction data can include diffracted waves 205 originating from the seabed object 210. The diffraction data can include diffracted waves 205 generated from a source shot 215. The plurality of receivers 110 can detect diffraction data from edges of objects. For example, the plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The plurality of receivers 110 can detect objects with irregular surface features. For example, the plurality of receivers 110 can detect objects with facets, edges, sharp boundaries, or textures.

The plurality of receivers 110 of the receiver array 105 can receive diffraction data. The diffraction data can include diffracted waves 205 diffracted off a seabed object that is smaller than a Fresnel zone. The Fresnel zone is an area of a reflected from which most of the energy of a reflection is returned and arrival times of the reflection differ by less than half a period from an arrival of energy propagated from an energy source. Waves with such arrival times may interfere constructively and be detected by a single arrival. Therefore, detecting reflection waves from an object smaller than the Fresnel zone may be difficult. However, the plurality of receivers 110 of the receiver array 105 can detect diffracted waves from an object smaller than the Fresnel zone.

The source array 127 can generate acoustic waves. The acoustic waves can include a source shot 215. The acoustic waves can diffract off the object in the seabed. The receiver array 105 can receive diffracted waves originating from the object in the seabed. The first source 150 can generate acoustic waves. The second source 155 can generate acoustic waves. The third source 160 can generate acoustic waves. The fourth source 165 can generate acoustic waves. The fifth source 170 can generate acoustic waves. The sixth source 175 can generate acoustic waves. The seventh source 180 can generate acoustic waves. The eighth source 185 can generate acoustic waves. A receiver of the plurality of receivers 110 of the receiver array 105 can receive the diffracted waves. A receiver disposed on the streamer 125 can receive the diffracted waves.

Figure 3:
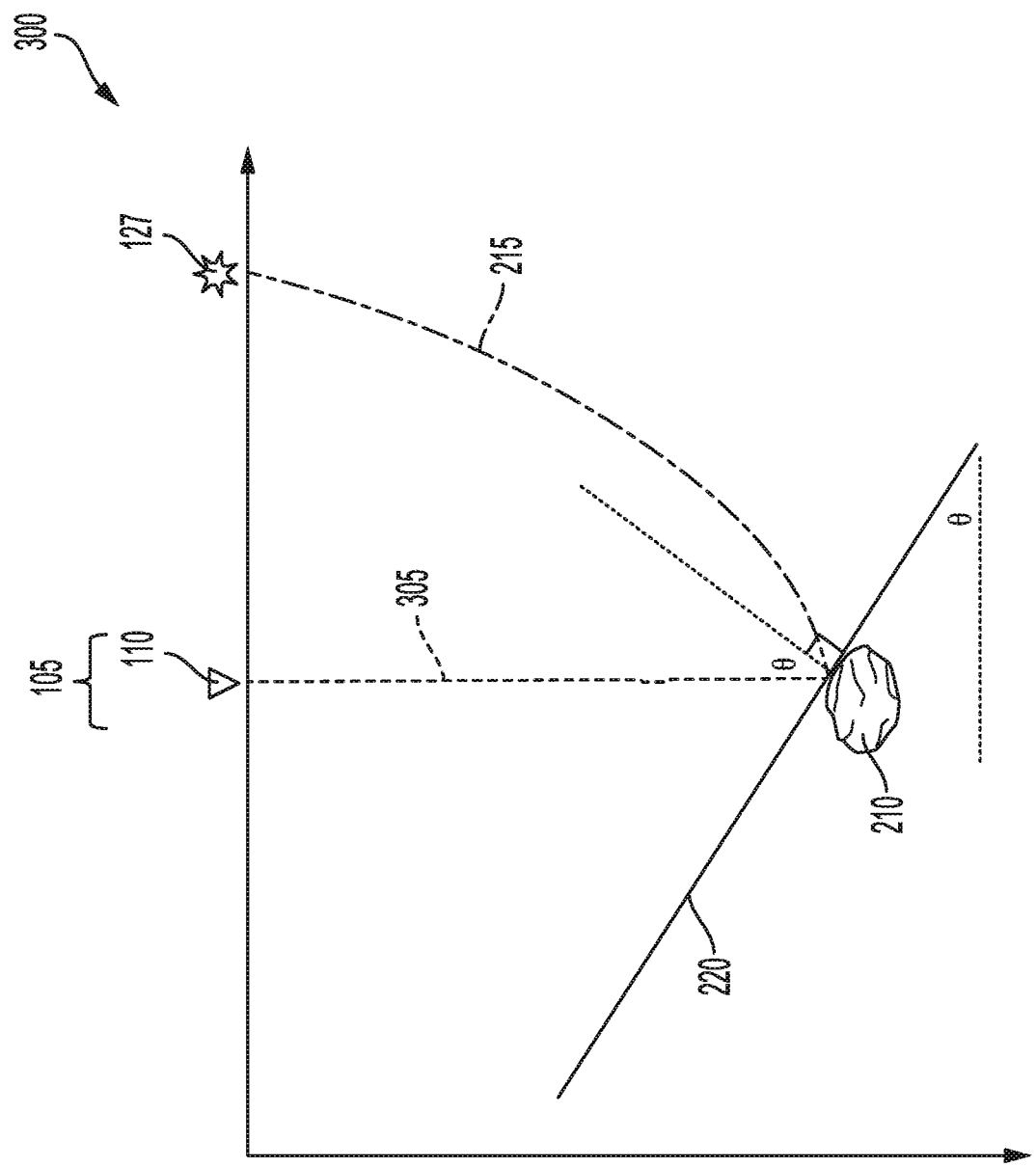
FIG. 3 illustrates a reflection survey according to an example implementation.

FIG. 3 illustrates an example reflection survey 300. The reflection survey 300 can include a receiver array 105 and a source array 127. The source array 127 can generate a source shot 215. The source shot 215 can travel through a medium (e.g., sea water) and reflect off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that reflect off the seabed object 210 may include reflection data. The reflection data may include a reflected wave 305. The receiver array 105 can receive reflection data. For example, the receiver array 105 can receive the reflected wave 305. A receiver of the plurality of receivers 110 can receive the reflected wave 305. The reflection data can include a reflected wave 305 originating from a seabed object. The reflection data can include the reflected wave 305 generated from a source shot 215. The plurality of sources of the source array 127 can generate an acoustic signal. The plurality of receivers 110 of the receiver array 105 can receive reflection data reflected off the object in the seabed. The reflection data can include a reflected wave 305. A receiver of the plurality of receivers 110 can receive the reflected wave 305 reflected off the object in the seabed and generated by a source of the plurality of sources of the source array 127. The plurality of receivers 110 can receive reflection data reflected off the object in the seabed 220.

Figure 4:
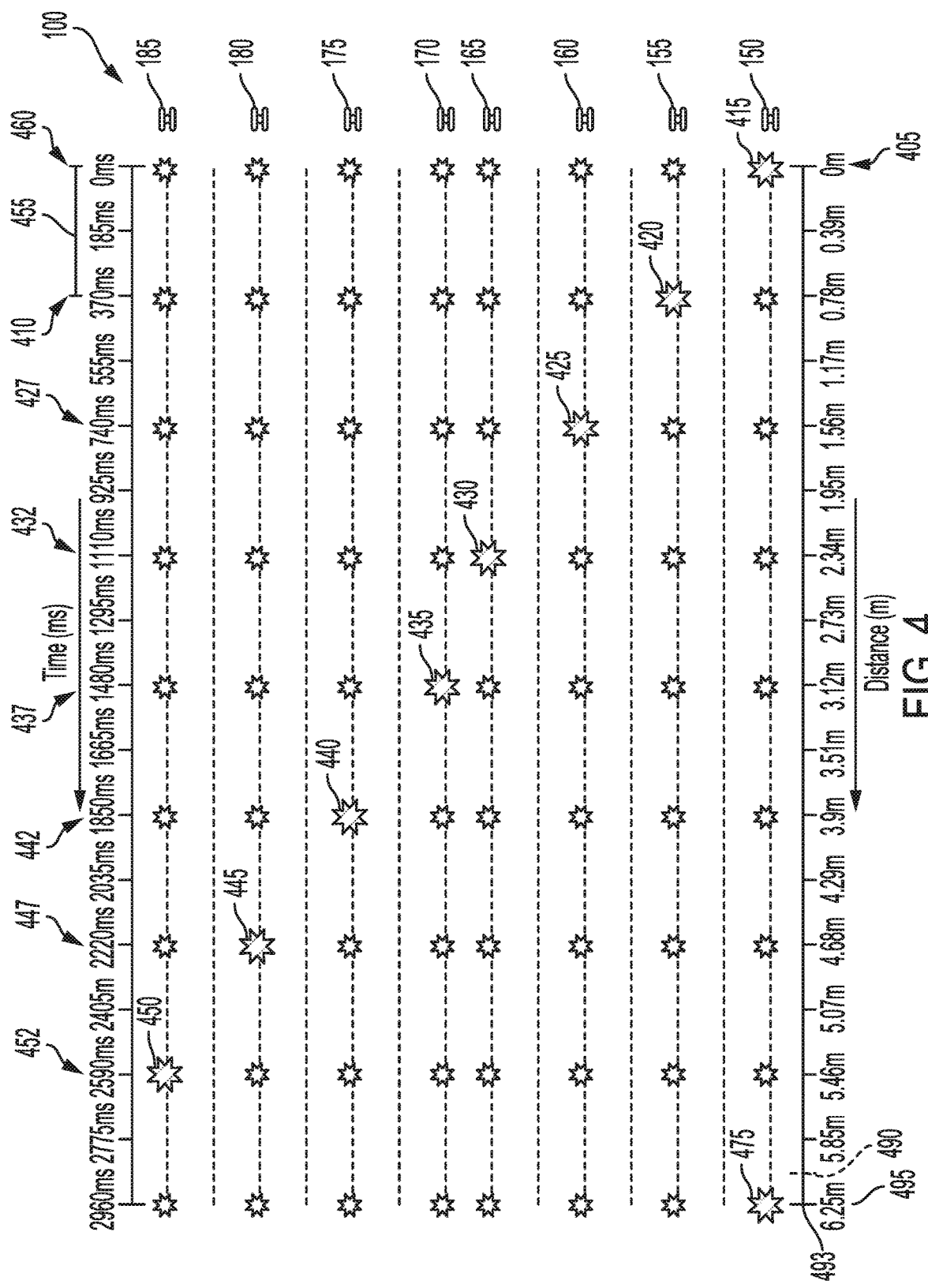
FIG. 4 illustrates a seabed object detection system according to an example implementation.

FIG. 4 illustrates an example seabed object detection system 100. The seabed object detection system 100 can include a first source 150. The seabed object detection system 100 can include a second source 155. The seabed object detection system 100 can include a third source 160. The seabed object detection system 100 can include a fourth source 165. The seabed object detection system 100 can include a fifth source 170. The seabed object detection system 100 can include a sixth source 175. The seabed object detection system 100 can include a seventh source 180. The seabed object detection system 100 can include an eighth source 185.

The seabed object detection system 100 can include a data processing system 800 described herein. The data processing system can have one or more processors 810. The data processing system 800 can determine a first position of the first source 405. The one or more processors 810 can determine a first position of the first source 405. For example, the one or more processors 810 can determine the first position of the first source 405 based on a satellite-based navigation system (e.g., GPS), geolocation, real-time locating systems, local positioning systems, among others. The one or more processors 810 can be located on the vessel 102 to determine the first position of the first source 405. For example, the first position of the first source 405 can occur at a reference location of 0 meters. The first position of the first source 405 can be a position of the first source 150.

The data processing system 800 can identify a first firing time of the second source 410. The one or more processors 810 can identify a first firing time of the second source 410. The one or more processors 810 can calculate a first firing time of the second source 410. For example, the one or more processors 810 can identify the first firing time of the second source 410 based on a speed of the vessel 102. The one or more processors 810 can identify that the first firing time of the second source 410 should occur at a predetermined time after a first firing time of the first source 460. For example, the one or more processors 810 can identify that the first firing time of the second source 410 should occur 370 milliseconds after the first firing time of the first source 460. The one or more processors 810 can determine that the first firing time of the second source 410 should occur 370 milliseconds after the first firing time of the first source 460. The firing time of the second source 410 can be a time of the second source 155.

The data processing system 800 can initiate a first source shot of the first source 415 at the first position of the first source 405. The one or more processors 810 can initiate a first source shot of the first source 415 at the first position of the first source 405. The one or more processors 810 can initiate a first source shot of the first source 415. The first source shot of the first source 415 can be a source shot 215 of the first source 150. The first source shot of the first source 415 can be an acoustic wave of the first source 150. The first source shot of the first source 415 can be an acoustic signal of the first source 150. The one or more processors 810 can initiate a first source shot of the first source 415 at the first position of the first source 405. The one or more processors 810 can initiate a first source shot of the first source 415 at the first firing time of the first source 460. For example, the first firing time of the first source 460 can be a reference time of 0 milliseconds. The first position of the first source 405 can be a reference position of 0 meters. The data processing system 800 can initiate a first source shot of the first source 415 at a known position.

The data processing system 800 can initiate a first source shot of the second source 420. The one or more processors 810 can initiate a first source shot of the second source 420. The data processing system 800 can initiate a first source shot of the second source 420 at the first firing time of the second source 410. The one or more processors 810 can initiate a first source shot of the second source 420 at the first firing time of the second source 410. The first source shot of the second source 420 can be a source shot 215 of the second source 155. The first source shot of the second source 420 can be an acoustic signal of the second source 155. The first source shot of the second source 420 can be an acoustic wave of the second source 155. The one or more processors 810 can initiate a first source shot of the second source 420 at the first firing time of the second source 410. For example, the first firing time of the second source 410 can be 370 milliseconds after the first firing time of the first source 405. The first firing time of the second source 410 can occur when the vessel 102 is approximately 0.78 meters away from the position of the vessel 102 when the vessel 102 fired the first source shot of the first source 415. The data processing system 800 can initiate a first source shot of the second source 420 at a known time.

The data processing system 800 can determine a target position 493 for the first source 150. The one or more processors 810 can determine a target position 493 for the first source 150. The one or more processors 810 can determine the target position 493 based on a speed of the vessel 102. The one or more processors 810 can determine the target position 493 based on a velocity of the vessel 102. The one or more processors 810 can determine the target position 493 based on the first position of the first source 405. For example, the target position 493 for the first source 150 can be less than 10 meters away from the first position of the first source 405 (e.g., 6.25 meters). The data processing system 800 can determine the target position 493 for the first source 150. The target position can be 6.25 meters from the first position of the first source 405. The target position can be less than 10 meters from the first position of the first source 405. The target position can be greater than 10 meters from the first position of the first source 405.

The data processing system 800 can determine an estimated position 490 for the first source. The one or more processors 810 can determine an estimated position 490 for the first source. The one or more processors 810 can determine the estimated position 490 based on the speed of the vessel 102. The one or more processors 810 can determine the estimated position 490 based on the velocity of the vessel 102. The one or more processors 810 can determine the estimated position 490 based on the first position of the first source 405.

The data processing system 800 can determine a second position of the first source 495. The one or more processors 810 can determine a second position of the first source 495. The one or more processors 810 can determine a second position of the first source 495 based on a difference between the target position 493 and the estimated position 490. For example, the vessel 102 can target to initiate a second source shot of the first source 475 a distance of 6.25 meters away from the reference position of 0 meters. For example, if the estimated position 490 is further away from the first position of the first source 405 than the target position 493, a second source shot of the first source 475 can be initiated earlier than calculated based on the speed of the vessel 102. For example, the target position 493 can be 6.25 meters. The estimated position 490 can be more than 6.25 meters. If the estimated position 490 is closer to the first position of the first source 405 than the target position 493, a second source shot of the first source 475 can be initiated later than calculated based on the speed of the vessel 102. For example, the target position 493 can be 6.25 meters. The estimated position 490 can be less than 6.25 meters. The target position 493 can be equal to the estimated position 490.

The data processing system 800 can initiate a second source shot of the first source 475. The one or more processors 810 can initiate a second source shot of the first source 475. The one or more processors 810 can initiate a second source shot of the first source 475 at the second position of the first source 495. The second position of the first source 495 can be 6.25 meters away from the first position of the first source 405. The data processing system 800 can initiate a second source shot of the first source 475 at a known time. The data processing system 800 can initiate a second source shot of the first source 475 at a known position.

The data processing system 800 can calculate a time interval 455 between the first firing time of the first source 460 and the first firing time of the second source 410. The one or more processors 810 can calculate a time interval 455 between the first firing time of the first source 460 and the first firing time of the second source 410. The data processing system 800 can calculate a time interval 455 between the first firing time of the first source 460 and the first firing time of the second source 410 that is less than one second. For example, the data processing system 800 can calculate a time interval 455 between the first firing time of the first source 460 and the first firing time of the second source 410 that is 370 milliseconds. The data processing system 800 can calculate a time interval between a first firing time of the first source 460 and the first firing time of the second source 410.

The data processing system 800 can calculate a time interval between a first firing time of the first source 460 and the first firing time of the second source 410 that is less than one second.

The data processing system 800 can delay a firing time. The data processing system 800 can delay the firing time of the second source shot of the first source 475. The one or more processors 810 can delay the firing time. The one or more processors 810 can delay the firing time of the second source shot of the first source 475. For example, the data processing system 800 can delay the firing time of the second source shot of the first source 475 by a calculated amount of time. The data processing system 800 can delay the firing time of the second source shot by a calculated amount of time based on the speed of the vessel 102. The data processing system 800 can delay the firing time of the second source shot of the first source 475 by a calculated amount of time based on the location of the vessel 102. The one or more processors 810 can delay the firing time of the second source shot of the first source 475 by a calculated amount of time based on the speed of the vessel 102. The one or more processors 810 can delay the firing time of the second source shot of the first source 475 by a calculated amount of time based on the location of the vessel 102.

The data processing system 800 can accelerate a firing time. The data processing system 800 can accelerate the firing time of the second source shot of the first source 475. The one or more processors 810 can accelerate the firing time. The one or more processors 810 can accelerate the firing time of the second source shot of the first source 475. For example, the data processing system 800 can accelerate the firing time of the second source shot of the first source 475 by a calculated amount of time. The data processing system 800 can accelerate the firing time of the second source shot by a calculated amount of time based on the speed of the vessel 102. The data processing system 800 can accelerate the firing time of the second source shot of the first source 475 by a calculated amount of time based on the location of the vessel 102. The one or more processors 810 can accelerate the firing time of the second source shot of the first source 475 by a calculated amount of time based on the speed of the vessel 102. The one or more processors 810 can accelerate the firing time of the second source shot of the first source 475 by a calculated amount of time based on the location of the vessel 102.

The data processing system 800 can calculate a first firing time of the third source 427. The one or more processors 810 can calculate a first firing time of the third source 427. For example, the one or more processors 810 can calculate the first firing time of the third source 427 based on a speed of the vessel 102. The one or more processors 810 can calculate that the first firing time of the third source 427 should occur at a predetermined time after a first firing time of the first source 460. For example, the one or more processors 810 can calculate that the first firing time of the third source 427 should occur 740 milliseconds after the first firing time of the first source 460. The one or more processors 810 can determine that the first firing time of the third source 427 should occur 740 milliseconds after the first firing time of the first source 460. The first firing time of the third source 427 can be a time of the third source 160. The data processing system 800 can calculate a fixed time interval between the first firing time of the second source 410 and the first firing time of the third source 427. The data processing system 800 can calculate a time interval between a first firing time of the second source 410 and the first firing time of the third source 427. The data processing system 800 can calculate a time interval between a first firing time of the second source 410 and the first firing time of the third source 427 that is less than one second.

The data processing system 800 can initiate a first source shot of the third source 425 at the first firing time of the third source 427. The one or more processors 810 can initiate a first source shot of the third source 425 at the first firing time of the third source 427. The first source shot of the third source 425 can be a source shot 215 of the third source 160. The first source shot of the third source 425 can be an acoustic signal of the third source 160. The first source shot of the third source 425 can be an acoustic wave of the third source 160. The one or more processors 810 can initiate a first source shot of the third source 425 at the first firing time of the third source 427. For example, the first firing time of the third source 427 can be 740 milliseconds after the first firing time of the first source 405. The first firing time of the third source 427 can occur when the vessel 102 is approximately 1.56 meters away from the position of the vessel 102 when the vessel 102 fired the first source shot of the first source 415. The data processing system 800 can initiate a first source shot of the third source 425 at a known time.

The data processing system 800 can calculate a first firing time of the fourth source 432. The one or more processors 810 can calculate a first firing time of the fourth source 432. For example, the one or more processors 810 can calculate the first firing time of the fourth source 432 based on a speed of the vessel 102. The one or more processors 810 can calculate that the first firing time of the fourth source 432 should occur at a predetermined time after a first firing time of the first source 460. For example, the one or more processors 810 can calculate that the first firing time of the fourth source 432 should occur 1110 milliseconds after the first firing time of the first source 460. The one or more processors 810 can determine that the first firing time of the fourth source 432 should occur 1110 milliseconds after the first firing time of the first source 460. The first firing time of the fourth source 432 can be a time of the fourth source 165. The data processing system 800 can calculate a fixed time interval between the first firing time of the third source 427 and the first firing time of the fourth source 432. The data processing system 800 can calculate a time interval between a first firing time of the third source 427 and the first firing time of the fourth source 432. The data processing system 800 can calculate a time interval between a first firing time of the third source 427 and the first firing time of the fourth source 432 that is less than one second.

The data processing system 800 can initiate a first source shot of the fourth source 430 at the first firing time of the fourth source 432. The one or more processors 810 can initiate a first source shot of the fourth source 430 at the first firing time of the fourth source 432. The first source shot of the fourth source 430 can be a source shot 215 of the fourth source 165. The first source shot of the fourth source 430 can be an acoustic signal of the fourth source 165. The first source shot of the fourth source 430 can be an acoustic wave of the fourth source 165. The one or more processors 810 can initiate a first source shot of the fourth source 430 at the first firing time of the fourth source 432. For example, the first firing time of the fourth source 432 can be 1110 milliseconds after the first firing time of the first source 405. The first firing time of the fourth source 432 can occur when the vessel 102 is approximately 2.34 meters away from the position of the vessel 102 when the vessel 102 fired the first source shot of the first source 415. The data processing system 800 can initiate a first source shot of the fourth source 430 at a known time.

The data processing system 800 can calculate a first firing time of the fifth source 437. The one or more processors 810 can calculate a first firing time of the fifth source 437. For example, the one or more processors 810 can calculate the first firing time of the fifth source 437 based on a speed of the vessel 102. The one or more processors 810 can calculate that the first firing time of the fifth source 437 should occur at a predetermined time after a first firing time of the first source 460. For example, the one or more processors 810 can calculate that the first firing time of the fifth source 437 should occur 1480 milliseconds after the first firing time of the first source 460. The one or more processors 810 can determine that the first firing time of the fifth source 437 should occur 1480 milliseconds after the first firing time of the first source 460. The first firing time of the fifth source 437 can be a time of the fifth source 170. The data processing system 800 can calculate a fixed time interval between the first firing time of the fourth source 432 and the first firing time of the fifth source 437. The data processing system 800 can calculate a time interval between a first firing time of the fourth source 432 and the first firing time of the fifth source 437. The data processing system 800 can calculate a time interval between a first firing time of the fourth source 432 and the first firing time of the fifth source 437 that is less than one second.

The data processing system 800 can initiate a first source shot of the fifth source 435 at the first firing time of the fifth source 437. The one or more processors 810 can initiate a first source shot of the fifth source 435 at the first firing time of the fifth source 437. The first source shot of the fifth source 435 can be a source shot 215 of the fifth source 170. The first source shot of the fifth source 435 can be an acoustic signal of the fifth source 170. The first source shot of the fifth source 435 can be an acoustic wave of the fifth source 170. The one or more processors 810 can initiate a first source shot of the fifth source 435 at the first firing time of the fifth source 437. For example, the first firing time of the fifth source 437 can be 1480 milliseconds after the first firing time of the first source 405. The first firing time of the fifth source 437 can occur when the vessel 102 is approximately 3.12 meters away from the position of the vessel 102 when the vessel 102 fired the first source shot of the first source 415. The data processing system 800 can initiate a first source shot of the fifth source 435 at a known time.

The data processing system 800 can calculate a first firing time of the sixth source 442. The one or more processors 810 can calculate a first firing time of the sixth source 442. For example, the one or more processors 810 can calculate the first firing time of the sixth source 442 based on a speed of the vessel 102. The one or more processors 810 can calculate that the first firing time of the sixth source 442 should occur at a predetermined time after a first firing time of the first source 460. For example, the one or more processors 810 can calculate that the first firing time of the sixth source 442 should occur 1850 milliseconds after the first firing time of the first source 460. The one or more processors 810 can determine that the first firing time of the sixth source 442 should occur 1850 milliseconds after the first firing time of the first source 460. The first firing time of the sixth source 442 can be a time of the sixth source 175. The data processing system 800 can calculate a fixed time interval between the first firing time of the fifth source 437 and the first firing time of the sixth source 442. The data processing system 800 can calculate a time interval between a first firing time of the fifth source 437 and the first firing time of the sixth source 442. The data processing system 800 can calculate a time interval between a first firing time of the fifth source 437 and the first firing time of the sixth source 442 that is less than one second.

The data processing system 800 can initiate a first source shot of the sixth source 440 at the first firing time of the sixth source 442. The one or more processors 810 can initiate a first source shot of the sixth source 440 at the first firing time of the sixth source 442. The first source shot of the sixth source 440 can be a source shot 215 of the sixth source 175. The first source shot of the sixth source 440 can be an acoustic signal of the sixth source 175. The first source shot of the sixth source 440 can be an acoustic wave of the sixth source 175. The one or more processors 810 can initiate a first source shot of the sixth source 440 at the first firing time of the sixth source 442. For example, the first firing time of the sixth source 442 can be 1110 milliseconds after the first firing time of the first source 405. The first firing time of the sixth source 442 can occur when the vessel 102 is approximately 3.9 meters away from the position of the vessel 102 when the vessel 102 fired the first source shot of the first source 415. The data processing system 800 can initiate a first source shot of the sixth source 440 at a known time.

The data processing system 800 can calculate a first firing time of the seventh source 447. The one or more processors 810 can calculate a first firing time of the seventh source 447. For example, the one or more processors 810 can calculate the first firing time of the seventh source 447 based on a speed of the vessel 102. The one or more processors 810 can calculate that the first firing time of the seventh source 447 should occur at a predetermined time after a first firing time of the first source 460. For example, the one or more processors 810 can calculate that the first firing time of the seventh source 447 should occur 2220 milliseconds after the first firing time of the first source 460. The one or more processors 810 can determine that the first firing time of the seventh source 447 should occur 2220 milliseconds after the first firing time of the first source 460. The first firing time of the seventh source 447 can be a time of the seventh source 180. The data processing system 800 can calculate a fixed time interval between the first firing time of the sixth source 442 and the first firing time of the seventh source 447. The data processing system 800 can calculate a time interval between a first firing time of the sixth source 442 and the first firing time of the seventh source 447. The data processing system 800 can calculate a time interval between a first firing time of the sixth source 442 and the first firing time of the seventh source 447 that is less than one second.

The data processing system 800 can initiate a first source shot of the seventh source 445 at the first firing time of the seventh source 447. The one or more processors 810 can initiate a first source shot of the seventh source 445 at the first firing time of the seventh source 447. The first source shot of the seventh source 445 can be a source shot 215 of the seventh source 180. The first source shot of the seventh source 445 can be an acoustic signal of the seventh source 180. The first source shot of the seventh source 445 can be an acoustic wave of the seventh source 180. The one or more processors 810 can initiate a first source shot of the seventh source 445 at the first firing time of the seventh source 447. For example, the first firing time of the seventh source 447 can be 2220 milliseconds after the first firing time of the first source 405. The first firing time of the seventh source 447 can occur when the vessel 102 is approximately 4.68 meters away from the position of the vessel 102 when the vessel 102 fired the first source shot of the first source 415. The data processing system 800 can initiate a first source shot of the seventh source 445 at a known time.

The data processing system 800 can calculate a first firing time of the eighth source 452. The one or more processors 810 can calculate a first firing time of the eighth source 452. For example, the one or more processors 810 can calculate the first firing time of the eighth source 452 based on a speed of the vessel 102. The one or more processors 810 can calculate that the first firing time of the eighth source 452 should occur at a predetermined time after a first firing time of the first source 460. For example, the one or more processors 810 can calculate that the first firing time of the eighth source 452 should occur 2590 milliseconds after the first firing time of the first source 460. The one or more processors 810 can determine that the first firing time of the eighth source 452 should occur 2590 milliseconds after the first firing time of the first source 460. The first firing time of the eighth source 452 can be a time of the eighth source 185. The data processing system 800 can calculate a fixed time interval between the first firing time of the seventh source 447 and the first firing time of the eighth source 452. The data processing system 800 can calculate a time interval between a first firing time of the seventh source 447 and the first firing time of the eighth source 452. The data processing system 800 can calculate a time interval between a first firing time of the seventh source 447 and the first firing time of the eighth source 452 that is less than one second.

The data processing system 800 can initiate a first source shot of the eighth source 450 at the first firing time of the eighth source 452. The one or more processors 810 can initiate a first source shot of the eighth source 450 at the first firing time of the eighth source 452. The first source shot of the eighth source 450 can be a source shot 215 of the eighth source 185. The first source shot of the eighth source 450 can be an acoustic signal of the eighth source 185. The first source shot of the eighth source 450 can be an acoustic wave of the eighth source 185. The one or more processors 810 can initiate a first source shot of the eighth source 450 at the first firing time of the eighth source 452. For example, the first firing time of the eighth source 452 can be 2590 milliseconds after the first firing time of the first source 405. The first firing time of the eighth source 452 can occur when the vessel 102 is approximately 5.46 meters away from the position of the vessel 102 when the vessel 102 fired the first source shot of the first source 415. The data processing system 800 can initiate a first source shot of the eighth source 450 at a known time.

Figure 5:
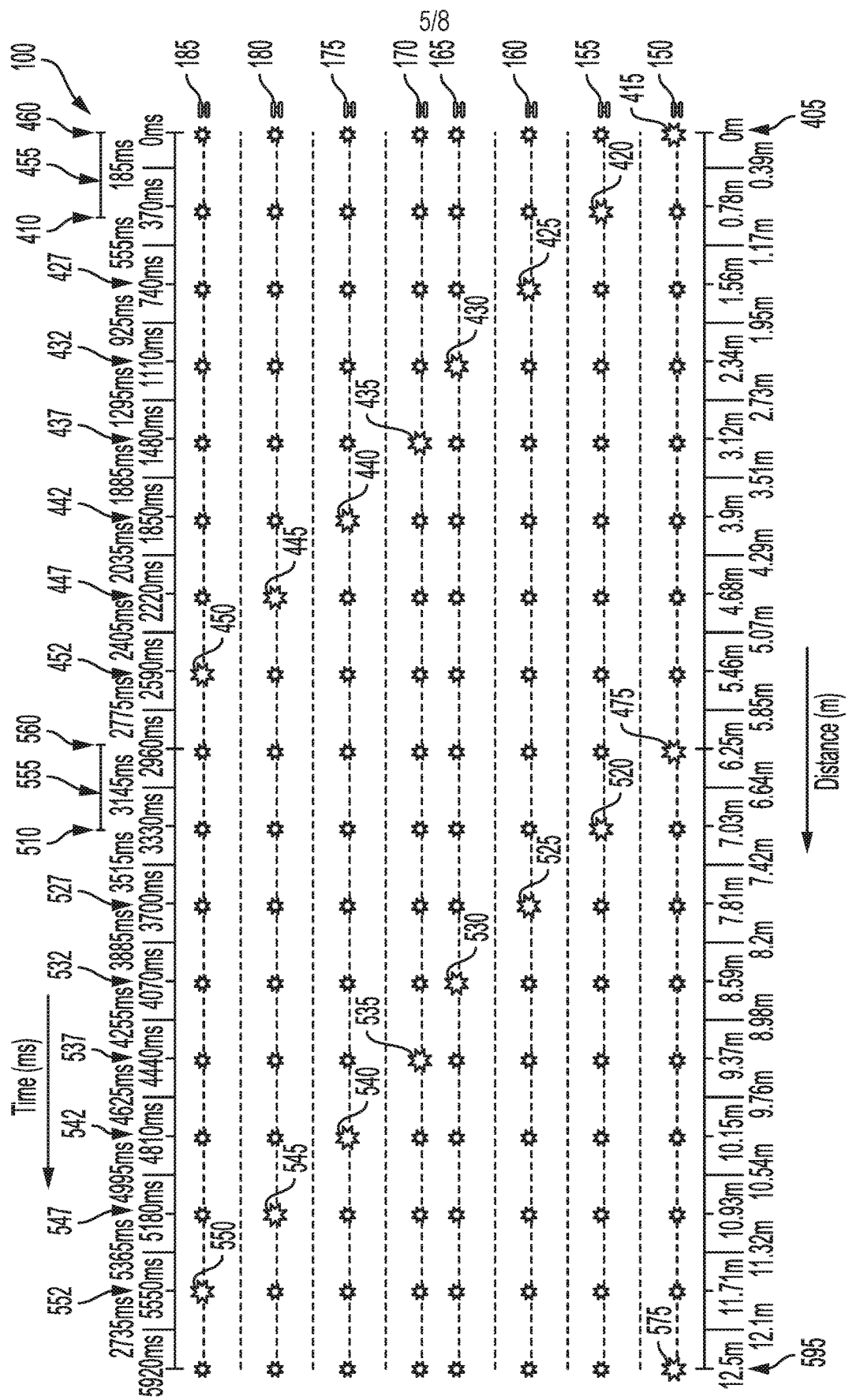
FIG. 5 illustrates a seabed object detection system according to an example implementation.

FIG. 5 illustrates a seabed object detection system 100. The seabed object detection system 100 can include a first source 150. The seabed object detection system 100 can include a second source 155. The seabed object detection system 100 can include a third source 160. The seabed object detection system 100 can include a fourth source 165. The seabed object detection system 100 can include a fifth source 170. The seabed object detection system 100 can include a sixth source 175. The seabed object detection system 100 can include a seventh source 180. The seabed object detection system 100 can include an eighth source 185.

The data processing system 800 can calculate a second firing time of the second source 510. The one or more processors 810 can calculate a second firing time of the second source 510. The data processing system 800 can identify a second firing time of the second source 510. The one or more processors 810 can identify a second firing time of the second source 510. The one or more processors 810 can calculate a second firing time of the second source 510. For example, the one or more processors 810 can identify the second firing time of the second source 510 based on a speed of the vessel 102. The one or more processors 810 can identify that the second firing time of the second source 510 should occur at a predetermined time after a first firing time of the first source 460. For example, the one or more processors 810 can identify that the second firing time of the second source 510 should occur 3330 milliseconds after the first firing time of the first source 460. The one or more processors 810 can determine that the second firing time of the second source 510 should occur 3330 milliseconds after the first firing time of the first source 460. The firing time of the second source 410 can be a time of the second source 155.

The data processing system 800 can initiate a second source shot of the second source 520 at the second firing time of the second source 510. The one or more processors 810 can calculate a second firing time of the second source 510. The data processing system 800 can initiate a second source shot of the second source 520. The one or more processors 810 can initiate a second source shot of the second source 520. The second source shot of the second source 520 can be a source shot 215 of the second source 155. The second source shot of the second source 520 can be an acoustic signal of the second source 155. The second source shot of the second source 520 can be an acoustic wave of the second source 155. The one or more processors 810 can initiate a second source shot of the second source 520 at the second firing time of the second source 510. For example, the second firing time of the second source 510 can be 3330 milliseconds after the first firing time of the first source 405. The second firing time of the second source 510 can occur when the vessel 102 is approximately 7.03 meters away from the position of the vessel 102 when the vessel 102 fired the first source shot of the first source 415. The data processing system 800 can initiate a second source shot of the second source 520 at a known time.

The data processing system 800 can calculate a time interval between the first firing time of the first source 460 and a second firing time of the first source 560. The one or more processors 810 can calculate a time interval between the first firing time of the first source 460 and the second firing time of the first source 560. The data processing system 800 can calculate a time interval between the first firing time of the first source shot of the first source 150 and the second firing time of the second source shot of the first source. The one or more processors 810 can calculate a time interval between the first firing time of the first source shot of the first source 460 and the second firing time of the second source shot of the first source. The data processing system 800 can calculate the time interval between the first firing time of the first source 460 and a second firing time of the first source 560 based on a speed of the vessel 102. The one or more processors 810 can calculate a time interval between the first firing time of the first source 460 and the second firing time of the first source 560 based on the speed of the vessel 102. For example, the time interval between the first firing time of the first source 460 and the second firing time of the first source 560 can be 2960 milliseconds.

The data processing system 800 can calculate a second firing time of the third source 527. The one or more processors 810 can calculate a second firing time of the third source 527. For example, the one or more processors 810 can calculate the second firing time of the third source 527 based on a speed of the vessel 102. The one or more processors 810 can calculate that the second firing time of the third source 527 should occur at a predetermined time after a first firing time of the first source 460. For example, the one or more processors 810 can calculate that the second firing time of the third source 527 should occur 3700 milliseconds after the first firing time of the first source 460. The one or more processors 810 can determine that the second firing time of the third source 527 should occur 3700 milliseconds after the first firing time of the first source 460. The second firing time of the third source 527 can be a time of the third source 160.

The data processing system 800 can initiate a second source shot of the third source 525 at the second firing time of the third source 527. The one or more processors 810 can initiate a second source shot of the third source 525 at the second firing time of the third source 527. The second source shot of the third source 525 can be a source shot 215 of the third source 160. The second source shot of the third source 525 can be an acoustic signal of the third source 160. The second source shot of the third source 525 can be an acoustic wave of the third source 160. The one or more processors 810 can initiate a second source shot of the third source 525 at the second firing time of the third source 527. For example, the second firing time of the third source 527 can be 3700 milliseconds after the first firing time of the first source 405. The second firing time of the third source 527 can occur when the vessel 102 is approximately 7.81 meters away from the position of the vessel 102 when the vessel 102 fired the first source shot of the first source 415. The data processing system 800 can initiate a second source shot of the third source 525 at a known time.

The data processing system 800 can calculate a second firing time of the fourth source 532. The one or more processors 810 can calculate a second firing time of the fourth source 532. For example, the one or more processors 810 can calculate the second firing time of the fourth source 532 based on a speed of the vessel 102. The one or more processors 810 can calculate that the second firing time of the fourth source 532 should occur at a predetermined time after a first firing time of the first source 460. For example, the one or more processors 810 can calculate that the second firing time of the fourth source 532 should occur 4070 milliseconds after the first firing time of the first source 460. The one or more processors 810 can determine that the second firing time of the fourth source 532 should occur 4070 milliseconds after the first firing time of the first source 460. The second firing time of the fourth source 532 can be a time of the fourth source 165.

The data processing system 800 can initiate a second source shot of the fourth source 530 at the second firing time of the fourth source 532. The one or more processors 810 can initiate a second source shot of the fourth source 530 at the second firing time of the fourth source 532. The second source shot of the fourth source 530 can be a source shot 215 of the fourth source 165. The second source shot of the fourth source 530 can be an acoustic signal of the fourth source 165. The second source shot of the fourth source 530 can be an acoustic wave of the fourth source 165. The one or more processors 810 can initiate a second source shot of the fourth source 530 at the second firing time of the fourth source 532. For example, the second firing time of the fourth source 532 can be 4070 milliseconds after the first firing time of the first source 405. The second firing time of the fourth source 532 can occur when the vessel 102 is approximately 8.59 meters away from the position of the vessel 102 when the vessel 102 fired the first source shot of the first source 415. The data processing system 800 can initiate a second source shot of the fourth source 530 at a known time.

The data processing system 800 can calculate a second firing time of the fifth source 537. The one or more processors 810 can calculate a second firing time of the fifth source 537. For example, the one or more processors 810 can calculate the second firing time of the fifth source 537 based on a speed of the vessel 102. The one or more processors 810 can calculate that the second firing time of the fifth source 537 should occur at a predetermined time after a first firing time of the first source 460. For example, the one or more processors 810 can calculate that the second firing time of the fifth source 537 should occur 4440 milliseconds after the first firing time of the first source 460. The one or more processors 810 can determine that the second firing time of the fifth source 537 should occur 4440 milliseconds after the first firing time of the first source 460. The second firing time of the fifth source 537 can be a time of the fifth source 170.

The data processing system 800 can initiate a second source shot of the fifth source 535 at the second firing time of the fifth source 537. The one or more processors 810 can initiate a second source shot of the fifth source 535 at the second firing time of the fifth source 537. The second source shot of the fifth source 535 can be a source shot 215 of the fifth source 170. The second source shot of the fifth source 535 can be an acoustic signal of the fifth source 170. The second source shot of the fifth source 535 can be an acoustic wave of the fifth source 170. The one or more processors 810 can initiate a second source shot of the fifth source 535 at the second firing time of the fifth source 537. For example, the second firing time of the fifth source 537 can be 4440 milliseconds after the first firing time of the first source 405. The second firing time of the fifth source 537 can occur when the vessel 102 is approximately 9.37 meters away from the position of the vessel 102 when the vessel 102 fired the first source shot of the first source 415. The data processing system 800 can initiate a second source shot of the fifth source 535 at a known time.

The data processing system 800 can calculate a second firing time of the sixth source 542. The one or more processors 810 can calculate a second firing time of the sixth source 542. For example, the one or more processors 810 can calculate the second firing time of the sixth source 542 based on a speed of the vessel 102. The one or more processors 810 can calculate that the second firing time of the sixth source 542 should occur at a predetermined time after a first firing time of the first source 460. For example, the one or more processors 810 can calculate that the second firing time of the sixth source 542 should occur 4810 milliseconds after the first firing time of the first source 460. The one or more processors 810 can determine that the second firing time of the sixth source 542 should occur 4810 milliseconds after the first firing time of the first source 460. The second firing time of the sixth source 542 can be a time of the sixth source 175.

The data processing system 800 can initiate a second source shot of the sixth source 540 at the second firing time of the sixth source 542. The one or more processors 810 can initiate a second source shot of the sixth source 540 at the second firing time of the sixth source 542. The second source shot of the sixth source 540 can be a source shot 215 of the sixth source 175. The second source shot of the sixth source 540 can be an acoustic signal of the sixth source 175. The second source shot of the sixth source 540 can be an acoustic wave of the sixth source 175. The one or more processors 810 can initiate a second source shot of the sixth source 540 at the second firing time of the sixth source 542. For example, the second firing time of the sixth source 542 can be 4810 milliseconds after the first firing time of the first source 405. The second firing time of the sixth source 542 can occur when the vessel 102 is approximately 10.15 meters away from the position of the vessel 102 when the vessel 102 fired the first source shot of the first source 415.

The data processing system 800 can initiate a second source shot of the sixth source 540 at a known time.

The data processing system 800 can calculate a second firing time of the seventh source 547. The one or more processors 810 can calculate a second firing time of the seventh source 547. For example, the one or more processors 810 can calculate the second firing time of the seventh source 547 based on a speed of the vessel 102. The one or more processors 810 can calculate that the second firing time of the seventh source 547 should occur at a predetermined time after a first firing time of the first source 460. For example, the one or more processors 810 can calculate that the second firing time of the seventh source 547 should occur 5180 milliseconds after the first firing time of the first source 460. The one or more processors 810 can determine that the second firing time of the seventh source 547 should occur 5180 milliseconds after the first firing time of the first source 460. The second firing time of the seventh source 547 can be a time of the seventh source 180.

The data processing system 800 can initiate a second source shot of the seventh source 545 at the second firing time of the seventh source 547. The one or more processors 810 can initiate a second source shot of the seventh source 545 at the second firing time of the seventh source 547. The second source shot of the seventh source 545 can be a source shot 215 of the seventh source 180. The second source shot of the seventh source 545 can be an acoustic signal of the seventh source 180. The second source shot of the seventh source 545 can be an acoustic wave of the seventh source 180. The one or more processors 810 can initiate a second source shot of the seventh source 545 at the second firing time of the seventh source 547. For example, the second firing time of the seventh source 547 can be 5180 milliseconds after the first firing time of the first source 405. The second firing time of the seventh source 547 can occur when the vessel 102 is approximately 10.93 meters away from the position of the vessel 102 when the vessel 102 fired the first source shot of the first source 415. The data processing system 800 can initiate a second source shot of the seventh source 545 at a known time.

The data processing system 800 can calculate a second firing time of the eighth source 552. The one or more processors 810 can calculate a second firing time of the eighth source 552. For example, the one or more processors 810 can calculate the second firing time of the eighth source 552 based on a speed of the vessel 102. The one or more processors 810 can calculate that the second firing time of the eighth source 552 should occur at a predetermined time after a first firing time of the first source 460. For example, the one or more processors 810 can calculate that the second firing time of the eighth source 552 should occur 5550 milliseconds after the first firing time of the first source 460. The one or more processors 810 can determine that the second firing time of the eighth source 552 should occur 5550 milliseconds after the first firing time of the first source 460. The second firing time of the eighth source 552 can be a time of the eighth source 185.

The data processing system 800 can initiate a second source shot of the eighth source 550 at the second firing time of the eighth source 552. The one or more processors 810 can initiate a second source shot of the eighth source 550 at the second firing time of the eighth source 552. The second source shot of the eighth source 550 can be a source shot 215 of the eighth source 185. The second source shot of the eighth source 550 can be an acoustic signal of the eighth source 185. The second source shot of the eighth source 550 can be an acoustic wave of the eighth source 185. The one or more processors 810 can initiate a second source shot of the eighth source 550 at the second firing time of the eighth source 552. For example, the second firing time of the eighth source 552 can be 5550 milliseconds after the first firing time of the first source 405. The second firing time of the eighth source 552 can occur when the vessel 102 is approximately 11.71 meters away from the position of the vessel 102 when the vessel 102 fired the first source shot of the first source 415. The data processing system 800 can initiate a second source shot of the eighth source 550 at a known time.

The data processing system 800 can initiate a third source shot of the first source 575. The one or more processors 810 can initiate a third source shot of the first source 575. The one or more processors 810 can initiate a third source shot of the first source 575 at a third position of the first source 595. The third position of the first source 595 can be 12.5 meters away from the first position of the first source 405. The third position of the first source 595 can be less than 12.5 meters away from the first position of the first source 405. The third position of the first source 595 can be greater than 12.5 meters away from the first position of the first source 405. The data processing system 800 can initiate a third source shot of the first source 575 at a known position. The data processing system 800 can initiate a third source shot of the first source 575 at a known time.

The data processing system 800 can calculate a time interval 555 between the second firing time of the first source 560 and second firing time of the second source 510. The one or more processors 810 can calculate a time interval 555 between the second firing time of the first source 560 and second firing time of the second source 510. The data processing system 800 can calculate a time interval 555 between the second firing time of the first source 560 and second firing time of the second source 510 that is less than one second. For example, the data processing system 800 can calculate a time interval 555 between the second firing time of the first source 560 and second firing time of the second source 510 that is 370 milliseconds.

The data processing system 800 can delay a firing time. The data processing system 800 can delay the firing time of the third source shot of the first source 575. The one or more processors 810 can delay the firing time. The one or more processors 810 can delay the firing time of the third source shot of the first source 575. For example, the data processing system 800 can delay the firing time of the third source shot of the first source 575 by a calculated amount of time. The data processing system 800 can delay the firing time of the second source shot by a calculated amount of time based on the speed of the vessel 102. The data processing system 800 can delay the firing time of the third source shot of the first source 575 by a calculated amount of time based on the location of the vessel 102. The one or more processors 810 can delay the firing time of the third source shot of the first source 575 by a calculated amount of time based on the speed of the vessel 102. The one or more processors 810 can delay the firing time of the third source shot of the first source 575 by a calculated amount of time based on the location of the vessel 102.

The data processing system 800 can accelerate a firing time. The data processing system 800 can accelerate the firing time of the third source shot of the first source 575. The one or more processors 810 can accelerate the firing time. The one or more processors 810 can accelerate the firing time of the third source shot of the first source 575. For example, the data processing system 800 can accelerate the firing time of the third source shot of the first source 575 by a calculated amount of time. The data processing system 800 can accelerate the firing time of the second source shot by a calculated amount of time based on the speed of the vessel 102. The data processing system 800 can accelerate the firing time of the third source shot of the first source 575 by a calculated amount of time based on the location of the vessel 102. The one or more processors 810 can accelerate the firing time of the third source shot of the first source 575 by a calculated amount of time based on the speed of the vessel 102. The one or more processors 810 can accelerate the firing time of the third source shot of the first source 575 by a calculated amount of time based on the location of the vessel 102.

Figure 6:
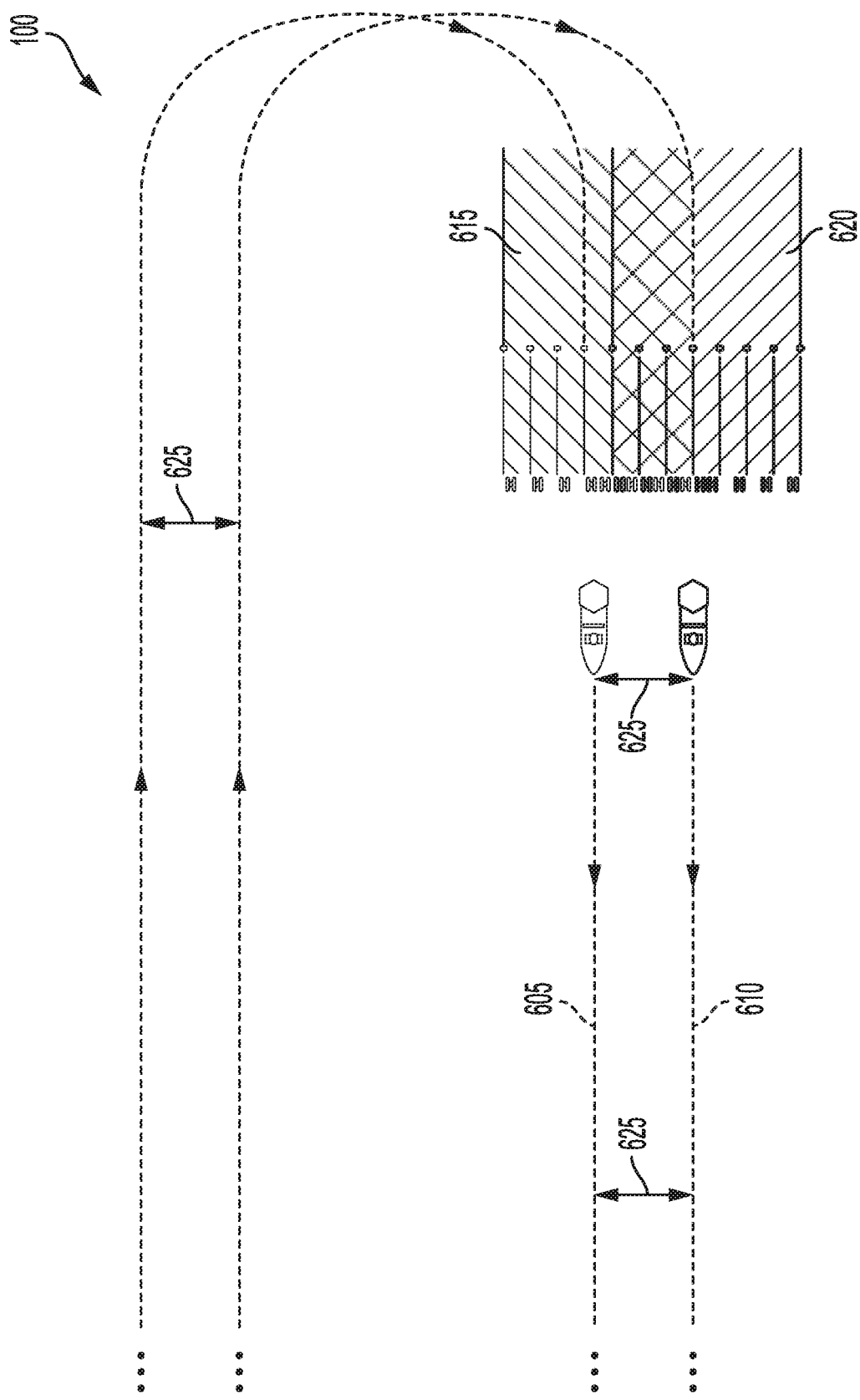
FIG. 6 illustrates a seabed object detection system according to an example implementation.

FIG. 6 illustrates a seabed object detection system 100. The seabed object detection system 100 can include the source array 127. The source array 127 can be towed as part of a first pass 605. For example, the source array 127 towed as part of the first pass 605 can define a first path 615. The vessel 102 can tow the source array 127 as part of the first pass 605. The source array 127 can be towed as part of a second pass 610. For example, the source array 127 towed as part of the second pass 610 can define a second path 620. The vessel 102 can tow the source array 127 as part of the first pass 605. The first path 615 can be interleaved with the second path 620. For example, the source array 127 towed during a first pass 605 can trace out the first path 615. The source array 127 towed during a second pass 610 can trace out the second path 620. The first path 615 and the second path 620 can overlap.

The seabed object detection system 100 perform a survey. The survey can include a first pass 605 and a second pass 610. The first pass 605 can proceed in a pattern (e.g., an elliptical pattern, an oval pattern, an obround pattern, a circular pattern). For example, the vessel 102 can tow the source array 127 as part of the first pass 605. The vessel 102 can tow the receiver array 105 as part of the first pass 605. The vessel 102 can tow the source array 127 as part of the second pass 610. The second pass 610 can proceed in a pattern (e.g., an elliptical pattern, an oval pattern, an obround pattern, a circular pattern). The vessel 102 can tow the receiver array 105 as part of the second pass 610. The first pass 605 can be a distance 625 from the second pass 610. The vessel 102 can tow the source array 127 as a part of the first pass 605 a distance 625 from the second pass 610. The vessel 102 can tow the receiver array 105 as part of the first pass 605 a distance 625 from the second pass 610.

The seabed object detection system 100 can include an offset 625 between the first path 615 and the second path 620. For example, the second source 155 during the first pass 605 can include an offset 625 from the second source 155 during the second pass 610. The first source 150 during the first pass 605 can include an offset 625 from the first source 150 during the second pass 610. The fourth source 165 during the first pass 605 can include an offset 625 from the fourth source 165 during the second pass 610. The third source 160 during the first pass 605 can include an offset 625 from the third source 160 during the second pass 610. For example, the streamer 125 during the first pass 605 can include an offset 625 from the streamer 125 during the second pass 610. The vessel 102 during the first pass 605 can include an offset 625 from the vessel 102 during the second pass 610.

The seabed object detection system 100 can include a vessel 102 configured to tow the receiver array 105 and the source array 127. The vessel 102 can tow the receiver array 105 and the source array 127 during a first pass 605. The first pass 605 can proceed in a pattern (e.g., an elliptical pattern, an oval pattern, an obround pattern, a circular pattern). For example, the vessel 102 can tow the source array 127 as part of the first pass 605. The vessel 102 can tow the receiver array 105 as part of the first pass 605.

The vessel 102 can tow the receiver array 105 and the source array 127 during a second pass 610. The vessel 102 can tow the source array 127 as part of the second pass 610. The vessel 102 can tow the receiver array 105 as part of the second pass 610. The second pass 610 can proceed in a pattern (e.g., an elliptical pattern, an oval s, an obround pattern, a circular pattern). For example, the vessel 102 can tow the source array 127 as part of the second pass 610. The vessel 102 can tow the receiver array 105 as part of the second pass 610.

The vessel 102 during the first pass 605 can be located a distance 625 from the vessel 102 during the second pass 610. The distance 625 can be based on a number of the plurality of streamers 115 and a distance between the plurality of streamers 115. The distance 625 can be the number of plurality of streamers 115 times the distance between the plurality of streamers divided by two. For example, the number of streamers can be eight. The distance between two streamers of the plurality of streamers 115 can be 12.5 m. Therefore the distance 625 can be 50 m. The number of streamers deployed can be an integer multiple of two. The number of streamers deployed can be equal to or greater than four. The number of sources deployed can be a multiple of the number of streamers deployed.

Figure 7:
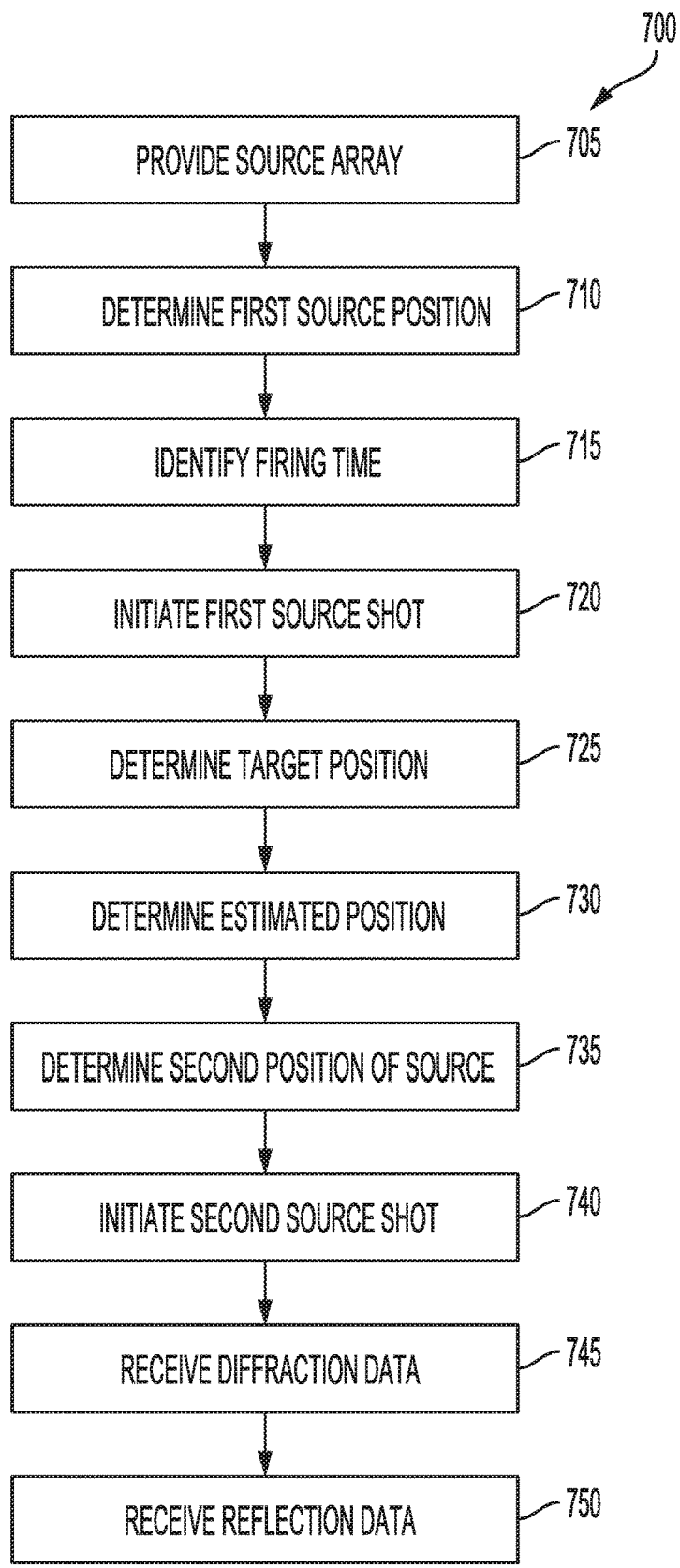
FIG. 7 illustrates a method of seabed object detection according to an example implementation.

FIG. 7 illustrates a method of seabed object detection. In brief summary, the method 700 can include providing a source array (BLOCK 705). The method 700 can include determining a first source position (BLOCK 710). The method 700 can include identifying a firing time (BLOCK 715). The method 700 can include initiating a first source shot (BLOCK 720). The method 700 can include determining a target position (BLOCK 725). The method 700 can include determining an estimated position (BLOCK 730). The method 700 can include determining a second position of a source (BLOCK 735). The method 700 can include initiating a second source shot (BLOCK 740). The method 700 can include receiving diffraction data (BLOCK 745). The method 700 can include receiving reflection data (BLOCK 750).

The method 700 can include providing a source array (BLOCK 705). The method can include providing a source array 127 including a first source 150. The method can include providing a source array 127 including a second source 155. The method can include providing a source array 127 including a third source 160. The method can include providing a source array 127 including a fourth source 165. The method can include providing a source array 127 including a fifth source 170. The method can include providing a source array 127 including a sixth source 175. The method can include providing a source array 127 including a seventh source 180. The method can include providing a source array 127 including an eighth source 185. The method can include towing, by a vessel 102, the source array 127. The method can include towing, by a vessel 102, the source array in a tow direction 101. The method can include generating, by the source array 127, a source shot 215. The method can include providing a receiver array 105 including a streamer 125.

The method 700 can include determining a first source position (BLOCK 710). The method can include determining, by a data processing system 800, a first position of the first source 405. The method can include determining, by a data processing system 800 having one or more processors 810, the first position of the first source 405. The method can include determining, by one or more processors 810, the first position of the first source 405.

The method 700 can include identifying a firing time (BLOCK 715). The method can include identifying, by the data processing system 800, a first firing time of the second source 410. The method can include identifying, by the one or more processors 810, the first firing time of the second source 410. The method can include calculating, by the data processing system 800, a first firing time of the second source 410. The method can include calculating, by the one or more processors 810, the first firing time of the second source 410. The method can include calculating, by the data processing system 800, a second firing time of the second source 510. The method can include calculating, by the one or more processors 810, the second firing time of the second source 510.

The method can include calculating, by the data processing system 800, the first firing time of the third source 427. The method can include calculating, by the one or more processors 810, the first firing time of the third source 427. The method can include calculating, by the data processing system 800, a second firing time of the third source 527. The method can include calculating, by the one or more processors 810, the second firing time of the third source 527. The method can include calculating, by the data processing system 800, the first firing time of the fourth source 432. The method can include calculating, by the one or more processors 810, the first firing time of the fourth source 432. The method can include calculating, by the data processing system 800, a second firing time of the fourth source 532. The method can include calculating, by the one or more processors 810, the second firing time of the fourth source 532.

The method 700 can include initiating a first source shot (BLOCK 720). The method can include initiating, by the data processing system 800, a first source shot of the first source 415. The method can include initiating, by the data processing system 800, a first source shot of the first source 415 at the first position of the first source 405. The method can include initiating, by the one or more processors 810, a first source shot of the first source 415. The method can include initiating, by the one or more processors 810, a first source shot of the first source 415 at the first position of the first source 405. The method can include initiating, by the data processing system 800, a first source shot of the second source 420. The method can include initiating, by the data processing system 800, a first source shot of the second source 420 at the first firing time of the second source 410. The method can include initiating, by the one or more processors 810, a first source shot of the second source 420. The method can include initiating, by the one or more processors 810, a first source shot of the second source 420 at the first firing time of the second source 410.

The method 700 can include determining a target position (BLOCK 725). The method can include determining, by the data processing system 800, a target position 493 for the first source 150. The method can include determining, by the one or more processors 810, a target position 493 for the first source 150. The method can include determining, by the data processing system 800, the target position 493 for the first source 150. The target position 493 can be 6.25 meters from the first position of the first source 405. The target position can be less than 10 meters from the first position of the first source 405. The target position can be greater than 10 meters from the first position of the first source 405.

The method 700 can include determining an estimated position (BLOCK 730). The method can include determining, by the data processing system 800, an estimated position 490 for the first source 150. The method can include determining, by the one or more processors 810, an estimated position 490 for the first source 150.

The method 700 can include determining a second position of a source (BLOCK 735). The method can include determining, by the data processing system 800, the second position of the first source 495. The method can include determining, by the data processing system 800, the second position of the first source 495 based on a difference between the target position 493 and the estimated position 490. The method can include determining, by the one or more processors 810, the second position of the first source 495. The method can include determining, by the one or more processors 810, the second position of the first source 495 based on a difference between the target position 493 and the estimated position 490.

The method 700 can include initiating a second source shot (BLOCK 740). The method can include initiating, by the data processing system 800, a second source shot of the first source 475 at the second position of the first source 495. The method can include initiating, by the one or more processors 810, a second source shot of the first source 475 at the second position of the first source 495. The method can include initiating, by the data processing system 800, a second source shot of the second source 520 at a second firing time of the second source 510. The method can include initiating, by the one or more processors 810, a second source shot of the second source 520 at a second firing time of the second source 510. The method can include initiating, by the data processing system 800, a first source shot of the third source 425 at a first firing time of the third source 427. The method can include initiating, by the one or more processors 810, a first source shot of the third source 427 at a first firing time of the third source 427. The method can include initiating, by the data processing system 800, a first source shot of the fourth source 430 at a first firing time of the fourth source 432. The method can include initiating, by the one or more processors 810, a first source shot of the fourth source 430 at a first firing time of the fourth source 432.

The method 700 can include initiating, by the data processing system 800, a first source shot of the fifth source 435 at a first firing time of the fifth source 437. The method can include initiating, by the one or more processors 810, a first source shot of the fifth source 435 at a first firing time of the fifth source 437. The method can include initiating, by the data processing system 800, a first source shot of the sixth source 440 at a first firing time of the sixth source 442. The method can include initiating, by the one or more processors 810, a first source shot of the sixth source 440 at a first firing time of the sixth source 442. The method can include initiating, by the data processing system 800, a first source shot of the seventh source 445 at a first firing time of the seventh source 447. The method can include initiating, by the one or more processors 810, a first source shot of the seventh source 445 at a first firing time of the seventh source 447. The method can include initiating, by the data processing system 800, a first source shot of the eighth source 450 at a first firing time of the eighth source 452. The method can include initiating, by the one or more processors 810, a first source shot of the eighth source 450 at a first firing time of the eighth source 452.

The method 700 can include initiating, by the data processing system 800, a second source shot of the third source 525 at a second firing time of the third source 527. The method can include initiating, by the one or more processors 810, a second source shot of the third source 525 at a second firing time of the third source 527. The method can include initiating, by the data processing system 800, a second source shot of the fourth source 530 at a second firing time of the fourth source 532. The method can include initiating, by the one or more processors 810, a second source shot of the fourth source 530 at a second firing time of the fourth source 532.

The method 700 can include initiating, by the data processing system 800, a second source shot of the fifth source 535 at a second firing time of the fifth source 537. The method can include initiating, by the one or more processors 810, a second source shot of the fifth source 535 at a second firing time of the fifth source 537. The method can include initiating, by the data processing system 800, a second source shot of the sixth source 540 at a second firing time of the sixth source 542. The method can include initiating, by the one or more processors 810, a second source shot of the sixth source 540 at a second firing time of the sixth source 542.

The method 700 can include initiating, by the data processing system 800, a second source shot of the seventh source 545 at a second firing time of the seventh source 547. The method can include initiating, by the one or more processors 810, a second source shot of the seventh source 545 at a second firing time of the seventh source 547. The method can include initiating, by the data processing system 800, a second source shot of the eighth source 550 at a second firing time of the eighth source 552. The method can include initiating, by the one or more processors 810, a second source shot of the eighth source 550 at a second firing time of the eighth source 552.

The method 700 can include calculating a time interval 455 between a first firing time of the first source 460 and the first firing time of the second source 410. The method 700 can include calculating, by a data processing system 800, a time interval 455 between a first firing time of the first source 460 and the first firing time of the second source 410. The method 700 can include calculating, by the one or more processors 810, a time interval 455 between a first firing time of the first source 460 and the first firing time of the second source 410. The method 700 can include calculating, by a data processing system 800, a time interval 455 between a first firing time of the first source 460 and the first firing time of the second source 410 based on a speed of a vessel 102. The method 700 can include calculating, by the one or more processors 810, a time interval 455 between a first firing time of the first source 460 and the first firing time of the second source 410 based on a speed of a vessel 102. The method can include calculating, by the data processing system 800, a time interval 455 between a first firing time of the first source 460 and the first firing time of the second source 410 that is less than one second. The method can include calculating, by the one or more processors 810, a time interval 455 between a first firing time of the first source 460 and the second first firing time of the second source 410 that is less than one second.

The method 700 can include calculating a time interval between a first firing time of the first source 460 and the second firing time of the first source 560. The method 700 can include calculating, by a data processing system 800, a time interval 455 between a first firing time of the first source 460 and the second firing time of the first source 560. The method 700 can include calculating, by the one or more processors 810, a time interval between a first firing time of the first source 460 and the second firing time of the first source 560. The method 700 can include calculating, by a data processing system 800, a time interval 455 between a first firing time of the first source 460 and the second firing time of the first source 560 based on a speed of a vessel 102. The method 700 can include calculating, by the one or more processors 810, a time interval between a first firing time of the first source 460 and the second firing time of the first source 560 based on a speed of a vessel 102. The method can include calculating, by the data processing system 800, a time interval between a first firing time of the first source 460 and a second firing time of the first source 560 based on a speed of the vessel 102. The method can include calculating, by the data processing system 800, a fixed time interval between the first firing time of the second source 410 and the first firing time of the third source 427.

The method 700 can include receiving diffraction data (BLOCK 745). The method can include receiving, by the receiver array 105, diffraction data that includes diffracted waves originating from a seabed object and generated from a source shot 215. The method can include receiving, by the receiver array 105, diffraction data diffracted off the object in the seabed. The method can include receiving, by the receiver array 105, diffracted waves originating from the object in the seabed 220. The plurality of receivers 110 of the receiver array 105 can receive diffraction data. The diffraction data can include diffracted waves 205 diffracted off a seabed object that is smaller than a Fresnel zone. The Fresnel zone is an area of a reflected from which most of the energy of a reflection is returned and arrival times of the reflection differ by less than half a period from an arrival of energy propagated from an energy source. Waves with such arrival times may interfere constructively and be detected by a single arrival. Therefore, detecting reflection waves from an object smaller than the Fresnel zone may be difficult. However, the plurality of receivers 110 of the receiver array 105 can detect diffracted waves 205 from an object smaller than the Fresnel zone. The method can include providing a plurality of receivers 110

The method 700 can include receiving reflection data (BLOCK 750). The method can include receiving, by the receiver array 105, reflection data reflected off the object in the seabed. The source array 127 can generate a source shot 215. The source shot can travel through a medium (e.g., sea water) and reflect off a seabed object. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that reflect off the seabed object 210 may include reflection data. The reflection data may include a reflected wave. The receiver array 105 can receive reflection data. For example, the receiver array 105 can receive the reflected wave. A receiver of the plurality of receivers 110 can receive the reflected wave 305. The reflection data can include a reflected wave 305 originating from a seabed object 210. The reflection data can include the reflected wave 305 generated from a source shot 215. The plurality of sources of the source array 127 can generate an acoustic signal. The plurality of receivers 110 of the receiver array 105 can receive reflection data reflected off the object in the seabed 220. The reflection data can include a reflected wave 305. A receiver of the plurality of receivers 110 can receive the reflected wave 305 reflected off the object in the seabed 220 and generated by a source of the plurality of sources of the source array 127.

The method 700 can include providing a receiver array 105. The receiver array 105 can include a plurality of receivers 110 disposed on a plurality of streamers. The method can include towing, by a vessel 102, the receiver array 105 and the source array 127. The method can include towing, by the vessel 102, the receiver array 105 and the source array 127 during a first pass 605. The method can include towing, by the vessel 102, the receiver array 105 and the source array 127 during a second pass 610. The vessel 102 during the first pass 605 can be located a distance 625 from the vessel 102 during the second pass 610. The distance 625 can be based on a number of the plurality of streamers and a distance between the plurality of streamers.

Figure 8:
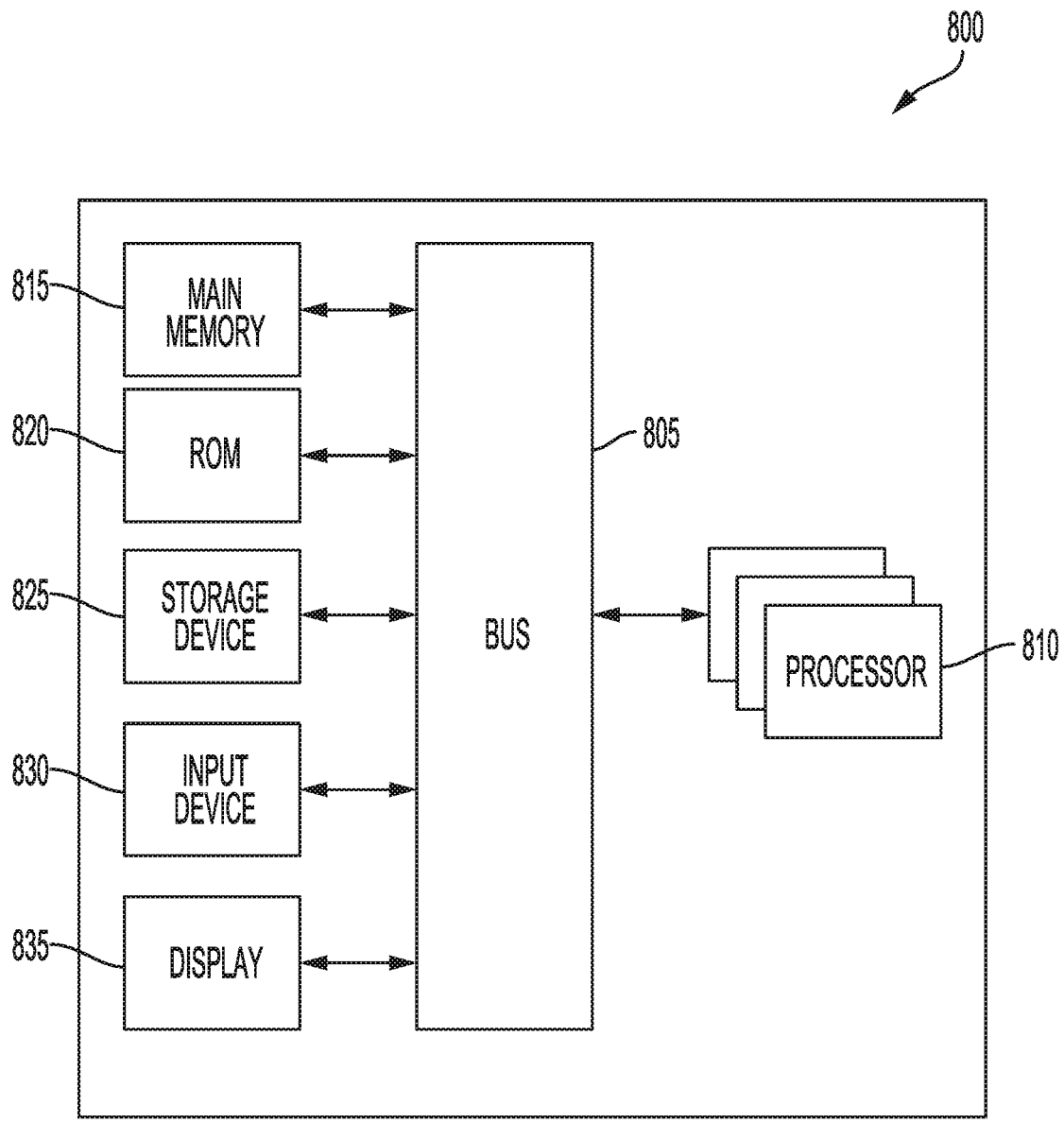
FIG. 8 depicts a block diagram of an architecture for a computing system employed to implement various elements of the systems or components depicted in FIGS. 1-7.

FIG. 8 depicts a block diagram of an architecture for a computing system employed to implement various elements of the systems or components depicted in FIGS. 1-3. FIG. 8 is a block diagram of a data processing system including a computer system 800 in accordance with an embodiment. The data processing system, computer system or computing device 800 can be used to implement one or more component configured to filter, translate, transform, generate, analyze, or otherwise process the data or signals depicted in FIGS. 1-3. The computing system 800 includes a bus 805 or other communication component for communicating information and a processor 810 or processing circuit coupled to the bus 805 for processing information. The computing system 800 can also include one or more processors 810 or processing circuits coupled to the bus for processing information. The computing system 800 also includes main memory 815, such as a random access memory (RAM) or other dynamic storage device, coupled to the bus 805 for storing information, and instructions to be executed by the processor 810. Main memory 815 can also be used for storing seismic data, binning function data, images, reports, tuning parameters, executable code, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835 or display device, such as a liquid crystal display, or active matrix display, for displaying information to a user. An input device 830, such as a keyboard including alphanumeric and other keys, may be coupled to the bus 805 for communicating information and command selections to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In some embodiments, hard-wired circuitry may be used in place of or in combination with software instructions to effect illustrative implementations. Thus, embodiments are not limited to any specific combination of hardware circuitry and software.

Although an example computing system has been described in FIG. 8, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A seabed object detection system, comprising:
a source array having a first source and a second source;
a data processing system having one or more processors, the data processing system to:
determine a first position of the first source;
identify a first firing time of the second source;
initiate a first source shot of the first source at the first position of the first source;
initiate a first source shot of the second source at the first firing time of the second source;
determine a target position for the first source, where the target position indicates a desired location to initiate a second source shot of the first source;
determine an estimated position for the first source, the estimated position indicates a location of the first source between the initiation of the first source shot of the first source and the initiation of the second source shot of the first source;
calculate a time interval between the first source shot of the first source and the second source shot of the first source;
determine, based on a difference between the target position and the estimated position, a second position of the first source; and
initiate the second source shot of the first source at the second position of the first source, the second source shot initiates earlier than the calculated time interval with the estimated position further away from the first position of the first source than the target position and initiates later than the calculated time interval with the estimated position closer to the first position of the first source than the target position; and
a receiver to receive diffraction data.

2. The seabed object detection system of claim 1, comprising the data processing system to:
calculate a second firing time of the second source; and
initiate a second source shot of the second source at the second firing time of the second source.

3. The seabed object detection system of claim 1, comprising:
the source array comprising a third source and a fourth source;
the data processing system to:
calculate a first firing time of the third source and a first firing time of the fourth source; and
initiate a first source shot of the third source at the first firing time of the third source and a first source shot of the fourth source at the first firing time of the fourth source.

4. The seabed object detection system of claim 1, comprising:
the data processing system to calculate the time interval between the first source shot of the first source and the second source shot of the first source based on a speed of a vessel.

5. The seabed object detection system of claim 1, comprising:
the data processing system to calculate a time interval between a first firing time of the first source and the first firing time of the second source.

6. The seabed object detection system of claim 1, comprising:
the data processing system to delay a firing time of the second source shot of the first source.

7. The seabed object detection system of claim 1, comprising:
the data processing system to accelerate a firing time of the second source shot of the first source.

8. The seabed object detection system of claim 1, comprising:
the data processing system to calculate a time interval between a first firing time of the first source and the first firing time of the second source that is less than one second.

9. The seabed object detection system of claim 1, comprising:
the source array to generate a source shot;
a receiver array comprising a streamer; and
a plurality of receivers coupled with the streamer, the plurality of receivers to receive diffraction data that includes diffracted waves originating from a seabed object and generated from the source shot.

10. The seabed object detection system of claim 1, comprising:
the source array to generate a source shot;
a receiver array comprising a streamer; and
a plurality of receivers coupled with the streamer, the plurality of receivers to receive reflection data reflected off an object in a seabed.

11. The seabed object detection system of claim 1, comprising:
a receiver array comprising a streamer;
a plurality of receivers coupled with the streamer; and
a vessel to tow the receiver array and the source array.

12. The seabed object detection system of claim 1, comprising:
a receiver array including a plurality of receivers disposed on a plurality of streamers;
a vessel to tow the receiver array and the source array, wherein:
the vessel tows the receiver array and the source array during a first pass; and
the vessel tows the receiver array and the source array during a second pass; and
wherein the vessel during the first pass is located a distance from the vessel during the second pass, the distance based on a number of the plurality of streamers and a distance between the plurality of streamers.

13. A method of seabed object detection, comprising:
providing a source array comprising a first source and a second source;
determining, by a data processing system having one or more processors, a first position of the first source;
identifying, by the data processing system, a first firing time of the second source;
initiating, by the data processing system, a first source shot of the first source at the first position of the first source;
initiating, by the data processing system, a first source shot of the second source at the first firing time of the second source;
determining, by the data processing system, a target position for the first source, where the target position indicates a desired location to initiate a second source shot of the first source;
determining, by the data processing system, an estimated position for the first source, the estimated position indicates a location of the first source between the initiation of the first source shot of the first source and the initiation of the second source shot of the first source;

calculating, by the data processing system, a time interval between the first source shot of the first source and the second source shot of the first source;

determining, by the data processing system, based on a difference between the target position and the estimated position, a second position of the first source; and initiating, by the data processing system, the second source shot of the first source at the second position of the first source, the second source shot initiates earlier than the calculated time interval with the estimated position further away from the first position of the first source than the target position and initiates later than the calculated time interval with the estimated position closer to the first position of the first source than the target position; and providing a receiver to receive diffraction data.

14. The method of claim 13, comprising:

calculating by the data processing system, a second firing time of the second source; and initiating by the data processing system, a second source shot of the second source at the second firing time of the second source.

15. The method of claim 13, comprising:

providing the source array comprising a third source and a fourth source;

calculating, by the data processing system, a first firing time of the third source and a first firing time of the fourth source; and initiating, by the data processing system, a first source shot of the third source at the first firing time of the third source and a first source shot of the fourth source at the first firing time of the fourth source.

16. The method of claim 13, comprising:

calculating, by the data processing system, the time interval between the first source shot of the first source and the second source shot of the first source based on a speed of a vessel.

17. The method of claim 13, comprising:

calculating, by the data processing system, a time interval between a first firing time of the first source and the first firing time of the second source.

18. The method of claim 13, comprising:

calculating, by the data processing system, a time interval between a first firing time of the first source and the first firing time of the second source that is less than one second.

19. The method of claim 13, comprising:

generating, by the source array, a source shot;

providing a receiver array comprising a streamer; and providing a plurality of receivers coupled with the streamer, the plurality of receivers to receive diffraction data that includes diffracted waves originating from a seabed object and generated from the source shot.

20. The method of claim 13, comprising:

providing a receiver array including a plurality of receivers disposed on a plurality of streamers;

towing, by a vessel, the receiver array and the source array;

towing, by the vessel, the receiver array and the source array during a first pass;

towing, by the vessel, the receiver array and the source array during a second pass; and wherein the vessel during the first pass is located a distance from the vessel during the second pass, the distance based on a number of the plurality of streamers and a distance between the plurality of streamers.

* * * * *